(12) United States Patent
Navio et al.

(10) Patent No.: US 11,207,589 B2
(45) Date of Patent: Dec. 28, 2021

(54) CONTROLLING A USER INTERFACE IN DIFFERENT VIEWS

(71) Applicant: KING.COM LTD., St. Julians (MT)

(72) Inventors: Miguel Navio, Barcelona (ES); Marta Cortinas, Barcelona (ES); Michele Airoldi, Barcelona (ES)

(73) Assignee: KING.COM LTD., St. Julians (MT)

( * ) Notice: Subject to any disclaimer, the term of this patent is extended or adjusted under 35 U.S.C. 154(b) by 25 days.

(21) Appl. No.: 16/690,796

(22) Filed: Nov. 21, 2019

(65) Prior Publication Data
US 2020/0330853 A1  Oct. 22, 2020

(30) Foreign Application Priority Data
Nov. 22, 2018 (GB) ..................................... 1819057

(51) Int. Cl.
*A63F 9/06* (2006.01)
*A63F 13/52* (2014.01)
*A63F 13/55* (2014.01)
*A63F 13/69* (2014.01)
*A63F 13/80* (2014.01)
*A63F 13/65* (2014.01)

(52) U.S. Cl.
CPC ............ *A63F 9/0612* (2013.01); *A63F 13/52* (2014.09); *A63F 13/55* (2014.09); *A63F 13/69* (2014.09); *A63F 13/80* (2014.09); *A63F 13/65* (2014.09); *A63F 2300/8082* (2013.01)

(58) Field of Classification Search
CPC .......... A63F 13/52; A63F 13/80; A63F 13/69; A63F 13/55; A63F 9/0612
See application file for complete search history.

(56) References Cited

U.S. PATENT DOCUMENTS

| 9,901,834 B2* | 2/2018 | Willman | A63F 13/56 |
| 9,911,272 B2* | 3/2018 | Knutsson | G07F 17/3244 |
| 10,478,733 B2* | 11/2019 | Willman | A63F 13/80 |
| 10,621,822 B2* | 4/2020 | Knutsson | G07F 17/3244 |
| 11,040,282 B2* | 6/2021 | Knutsson | A63F 13/537 |
| 2012/0004026 A1* | 1/2012 | Vann | G07F 17/3244 463/25 |
| 2013/0331162 A1* | 12/2013 | Krivicich | A63F 13/426 463/10 |
| 2014/0080560 A1* | 3/2014 | Knutsson | A63F 13/46 463/10 |

(Continued)

*Primary Examiner* — William H McCulloch, Jr.
(74) *Attorney, Agent, or Firm* — Saul Ewing Arnstein & Lehr LLP

(57) ABSTRACT

A computer device configured to: (a) render a game level in which a game board comprises a plurality of user selectable game elements of at least two types; (b) detect that a user has caused two user selectable game elements of the same type to be removed; (c) execute a refill process to refill vacancies on the game board after the game elements have been removed; (d) detect that a user has attained at least one objective of the game level by causing removal of certain user selectable game elements after a refill process; (e) access from a store a first portion of an object to be rendered on the display, the first portion associated with the at least one objective of the game level; and (f) in an environment view, render the first portion of the object within a representation of the virtual environment.

21 Claims, 30 Drawing Sheets

(56) References Cited

U.S. PATENT DOCUMENTS

| | | | | |
|---|---|---|---|---|
| 2014/0080561 A1* | 3/2014 | Knutsson | ............... | A63F 13/25 |
| | | | | 463/10 |
| 2014/0148230 A1* | 5/2014 | Guase | ................... | G07F 17/329 |
| | | | | 463/12 |
| 2015/0111643 A1* | 4/2015 | Olofsson | ............... | A63F 13/493 |
| | | | | 463/31 |
| 2015/0174488 A1* | 6/2015 | Dancau | ................... | A63F 13/57 |
| | | | | 463/9 |
| 2020/0330853 A1* | 10/2020 | Navio | ..................... | A63F 13/65 |
| 2021/0187399 A1* | 6/2021 | Soderqvist | ............ | A63F 13/822 |
| 2021/0197085 A1* | 7/2021 | Johnsson | ............... | A63F 13/30 |

\* cited by examiner

CONTROLLING A USER INTERFACE IN DIFFERENT VIEWS

CROSS-REFERENCE TO RELATED APPLICATIONS

This application is based on, and claims priority to GB Application No. 1819057.9, filed Nov. 22, 2018, the entire contents of which being fully incorporated herein by reference.

TECHNICAL FIELD OF INVENTION

The present disclosure relates to controlling a user interface responsive to user engagement with displayed elements on the interface of a computer device.

BACKGROUND OF THE INVENTION

There are multiple technical challenges facing the designer of computer-implemented games to create a fun and compelling game. One particular challenge is that of engagement.

Engagement involves designing gameplay to be engaging and rewarding to players. This typically requires games to be easily understood at their simplest or introductory levels, providing rewarding gameplay with quite simple game mechanics, but becoming progressively more challenging so that players are not bored, but remain engaged and develop rewarding skills. Effective engagement requires various forms of feedback to reinforce players' sense of success and accomplishment.

One technical area where there are particular challenges in controlling the display of a computer device is in the design of computer-implemented games. Not only is there a requirement to create fun and compelling games, these games need to be delivered to a player in a seamless and engaging fashion, while adhering to complex game rules.

Games have been developed in which a user engages game elements in a board to achieve certain objectives, by causing game elements to be removed in a strategic fashion.

A 'clicker game' is a type of casual puzzle game where the player is required to find patterns on a seemingly chaotic board. The player then has to match two or more of the same type of game element on the game board and those matched elements will then be removed from the board. The player matches adjacent game elements of the same type by selecting one or more of the game elements in the group of matching elements.

A 'switcher game' is also a type of casual puzzle game where the player is required to find patterns on a seemingly chaotic board. In a switcher game, the player switches the locations of two adjacent game elements on the game board so that one or both of them create a chain of at least three adjacent game elements of the same type. Those matched game elements will then disappear. The game board is then repopulated with game objects.

SUMMARY OF THE INVENTION

In order to increase involvement in such games, the present inventors have devised a 'play to build' paradigm, in which games such as clickers and switchers are combined with building a virtual world. A 'city-building game' is a type of game in which the player acts as the overall planner and leader of a town or city. The player is responsible for the growth and management strategy of the city. The player chooses the location of buildings and other city management features, and the city develops accordingly.

According to a first aspect of the present invention, there is provided a computer device comprising: one or more processors; and a user interface comprising a display; the one or more processor being configured: (a) in a game view render on the display a game level in which a game board comprises a plurality of user selectable game elements of at least two types; (b) detect that a user has caused at least two user selectable game elements of the same type to be removed by engaging with at least one of the user selectable game elements prior to its removal; (c) execute a refill process to refill vacancies on the game board after the game elements have been removed; (d) detect that a user has attained at least one objective of the game level by causing removal of at least certain user selectable game elements after one or more refill process: (e) access a first portion from a store holding at least first and second portions of an object, the first and second portions being associated respectively with first and second objectives, a first portion of the object to be rendered on the display, the first portion associated with the at least one objective of the game level; and (f) in an environment view, render on the display a representation of the virtual environment and, within the representation of the virtual environment, the first portion of the object.

The one or more processor may be configured to generate the game view by rendering a game board for a subsequent level, wherein attainment of at least one objective of the subsequent level causes a subsequent portion of the object to be accessed and rendered in the environment view.

The one or more processor may be configured to detect that the user has attained objectives in each of a set of levels, each level associated with a portion of the object, whereby the user has completed the object, and render the completed object on the display in the environment view.

The one or more processor may be configured to detect that the user has interacted with the object or a portion of the object and change the location of the object, or portion of the object, in the virtual environment under the control of the user.

The one or more processor may be configured to present the user with object options on the display and detect selection by the user of one of the object options and accessing a set of levels associated with that object option.

The one or more processor may be configured to display the selected object as a visualisation to a user with one or more user engageable customisation tools operable by the user to customise the appearance of the object prior to the user's engagement with the set of levels.

The one or more processor may be configured to detect that the user has attained multiple objectives in the game level, prior to accessing the portion of the object.

The one or more processor may be configured to render in the game view a visualisation of the portion of the object associated with the at least one objective of the level that the user is playing and updating the visualisation when the user makes contributing game moves which contribute towards the user attaining the at least one objective of the level.

The one or more processor may be configured to, if the user fails to attain the or all objectives of the level, render in the environment view only the portion(s) of the object associated with any prior levels which the user has completed.

The one or more processor may be configured to render on the display in the environment view a plurality of different characters, detect selection by the user of one of the characters and present to the user at least one story option associated with the selected character, the at least one story option presenting a user with a set of object options.

The computer readable code may be configured to, in step (b) detect that a user has selected the at least one of the user selectable game objects in a group of adjacent game elements of the same type, the group comprising at least two adjacent game elements of the same type.

The one or more processor may be configured to, in step (b) detect that a user has switched the respective locations of two adjacent game elements, thereby creating a match condition of at least three adjacent game elements of the same type.

The computer readable code may be configured to: generate in the game board a special game element which when activated causes a first defined group of game elements on the game board to be removed; detect an association between the special game element and at least one of the game elements which have been removed by its action; generate at the location of the at least one associated game element a second special game element which when activated causes a second defined group of game elements to be removed. The special game element and its associated features mentioned below may be utilised in conjunction with other aspects claimed herein or independently.

The association between the special game element and the removed game element may be that they are of the same type.

The first defined group of game elements may be aligned in a first direction and the second defined group of game elements may be aligned in a second direction. The game board may be arranged with the game elements in rows and columns, wherein the first direction comprises a row or a column, and the second direction comprises respectively a column or a row.

The first and second defined group of game elements may be arranged in an array adjacent to the first and second special game element respectively.

The one or more processor may be configured to generate on the game board at least two special game elements which are adjacent to each other, and detect that a user has interacted with one of the special game elements to move it to the location of the other of the special game elements, thereby generating an augmented game element.

The game board may comprise a plurality of obscuring components, which obscure all or part of the game board. The one or more processor may be configured to, in response to step (b), review at least one of the obscuring component(s) adjacent a location from which the game elements were reviewed to reveal game elements which were obscured by the obscuring component(s).

According to a second aspect of the invention, there is provided a method of controlling a display of a computer device to render an object in a virtual environment, the method comprising: (a) in a game view rendering on the display a game level in which a game board comprises a plurality of user selectable game elements of at least two types; (b) detecting that a user has caused at least two user selectable game elements of the same type to be removed by engaging with at least one of the user selectable game elements prior to its removal; (c) executing a refill process to refill vacancies on the game board after the game elements have been removed; (d) detecting that a user has attained at least one objective of the game level by causing removal of at least certain user selectable game elements after one or more refill process; (e) accessing a first portion from a store holding at least first and second portions of an object, the first and second portions being associated respectively with first and second objectives, a first portion of the object to be rendered on the display, the first portion associated with the at least one objective of the game level; and (f) in an environment view, rendering on the display a representation of the virtual environment and, within the representation of the virtual environment, the first portion of the object.

The step of generating the game view may be performed by rendering a game board for a subsequent level, wherein attainment of at least one objective of the subsequent level causes a subsequent portion of the object to be accessed.

Whether the user has attained objectives in each of a set of levels may be detected, each level associated with a portion of the object, whereby the user has completed the object, and the completed object may be rendered on the display in the environment view.

The method may comprise the step of detecting that the user has interacted with the object or a portion of the object and the location of the object, or portion of the object, may be changed in the virtual environment under the control of the user.

The user may be presented with object options on the display and selection by the user of one of the object options may be detected. A set of levels associated with that object option may be accessed.

The selected object may be displayed as a visualisation to a user with one or more user engageable customisation tools operable by the user to customise the appearance of the object prior to the user's engagement with the set of levels.

It may be detected that the user has attained multiple objectives in the game level, prior to accessing the portion of the object.

A visualisation of the portion of the object associated with the at least one objective of the level that the user is playing may be rendered in the game view and the visualisation may be updated when the user makes contributing game moves which contribute towards the user attaining the at least one objective of the level.

If the user fails to attain the or all objectives of the level, only the portion(s) of the object associated with any prior levels which the user has completed may be rendered in the environment view.

A plurality of different characters may be rendered on the display in the environment view, selection of one of the characters by the user may be detected and at least one story option associated with the selected character may be presented to the user, the at least one story option presenting a user with a set of object options.

Step (b) may comprise detecting that a user has selected the at least one of the user selectable game objects in a group of adjacent game elements of the same type, the group comprising at least two adjacent game elements of the same type.

Step (b) may comprise detecting that a user has switched the respective locations of two adjacent game elements, thereby creating a match condition of at least three adjacent game elements of the same type.

A special game element may be generated in a gameboard which when activated causes a first defined group of game elements on the game board to be removed. An association between the special game element and at least one of the game elements which have been removed by its action may be detected. At the location of the at least one associated game element a second special game element may be generated which when activated causes a second defined group of game elements to be removed.

The association between the special game element and the removed game element may be that they are of the same type.

The first defined group of game elements may be aligned in a first direction and the second defined group of game elements may be aligned in a second direction.

The game board may be arranged with the game elements in rows and columns, wherein the first direction comprises a row or a column, and the second direction comprises respectively a column or a row.

The first and second defined group of game elements may be arranged in an array adjacent to the first and second special game element respectively.

At least two special game elements which are adjacent to each other may be generated on the gameboard. It may be detected that a user has interacted with one of the special game elements to move it to the location of the other of the special game elements, thereby generating an augmented game element.

The game board may comprise a plurality of obscuring components, which obscure all or part of the game board, and in response to step (b) of the method, at least one of the obscuring component(s) adjacent a location from which the game elements were reviewed may be reviewed to reveal game elements which were obscured by the obscuring component(s).

According to a third aspect of the invention there is provided a non transitory computer readable medium having stored thereon computer instructions which when executed by a processor in a computer device having a display cause the following steps to be carried out:

(a) in a game view rendering on the display a game level in which a game board comprises a plurality of user selectable game elements of at least two types;

(b) detecting that a user has caused at least two user selectable game elements of the same type to be removed by engaging with at least one of the user selectable game elements prior to its removal;

(c) executing a refill process to refill vacancies on the game board after the game elements have been removed;

(d) detecting that a user has attained at least one objective of the game level by causing removal of at least certain user selectable game elements after one or more refill process;

(e) accessing a first portion from a store holding at least first and second portions of an object, the first and second portions being associated respectively with first and second objectives, a first portion of the object to be rendered on the display, the first portion associated with the at least one objective of the game level; and (f) in an environment view, rendering on the display a representation of the virtual environment and, within the representation of the virtual environment, the first portion of the object.

According to a fourth aspect of the present invention, there is provided a method of controlling a display of a computer device to render an object in a virtual environment, the method comprising: (a) rendering on the display for a first level a game board comprising a plurality of user selectable game elements of at least two types; (b) detecting that a user has caused at least two user selectable game elements of the same type to be removed by engaging with at least one of the user selectable game elements prior to its removal; (c) executing a refill process to refill vacancies on the game board; (d) detecting that a user has attained at least one objective of the first level by causing removal of at least certain user selectable game elements after one or more refill process; (e) accessing a first portion of the object to be rendered on the display, the first portion associated with the at least one objective of the first level; (f) rendering on the display (i) a visualisation of the first portion of the object and (ii) a game board for a subsequent level, wherein attainment of at least one objective of the subsequent level causes a subsequent portion of the object to be accessed.

A visualisation of the completed object may be rendered on the display after the user has attained objectives in each of a set of levels, each level associated with a portion of the object.

The status of the first portion of the object may be changed from a visualisation status to an interactive status, wherein in the interactive status the first portion of the object is engageable by a user to be moved within the virtual environment.

The status of the completed object may be changed from a visualisation status to an interactive status, wherein in the interactive status the completed object is engageable by a user to be moved within the virtual environment.

The user may be presented with object options on the display and selection by the user of one of the object options may be detected and a set of levels associated with that object option may be accessed.

The selected object may be displayed as a visualisation to a user with one or more user engageable customisation tools operable by the user to customise the appearance of the object prior to the user's engagement with the set of levels.

It may be detected that the user has attained multiple objectives in one or more of the levels, prior to accessing the portion of the object.

The visualisation of the portion of the object associated with the at least one objective of the level the user is playing may be updated when the user makes contributing game moves which contribute towards the user attaining the at least one objective of the level.

If the user fails to attain the or all objectives of a level, the visualisation of the object may be reverted back to a visualisation of the portions of the object associated with any prior levels which the user has completed.

A plurality of different characters may be rendered on the display. Selection by the user of one of the characters may be detected and at least one story option associated with the selected character may be presented to the user, the at least one story option presenting a user with a set of object options.

Step (b) may comprise detecting that a user has selected the at least one of the user selectable game objects in a group of adjacent game elements of the same type, the group comprising at least two adjacent game elements of the same type.

Step (b) may comprise detecting that a user has switched the respective locations of two adjacent game elements, thereby creating a match condition of at least three adjacent game elements of the same type.

A special game element may be generated in the gameboard which when activated causes a first defined group of game elements on the game board to be removed. An association between the special game element and at least some of the game elements which have been removed by its action may be detected. At the location of the at least one associated game element a second special game element may be generated which when activated causes a second defined group of game elements to be removed.

The association between the special game element and the removed game element may be that they are of the same type.

The first defined group of game elements may be aligned in a first direction; and the second defined group of game elements may be aligned in a second direction.

The game board may be arranged with the game elements in rows and columns, wherein the first direction comprises a row or a column, and the second direction comprises respectively a column or a row.

The first and second defined group of game elements may be arranged in an array adjacent to the first or second special game element respectively.

At least two special game elements which are adjacent to each other may be generated on the gameboard. It may be detected that a user has interacted with one of the special game elements to move it to the location of the other of the special game elements.

According to a fifth aspect of the present invention, there is provided a computer device comprising:
  one or more processors; and
  a display;
  the one or more processor is being configured to control the display to render an object in a virtual environment, by
    (a) rendering on the display for a first level a game board comprising a plurality of user selectable game elements of at least two types;
    (b) detecting that a user has caused at least two user selectable game elements of the same type to be removed by engaging with at least one of the user selectable game elements prior to its removal;
    (c) executing a refill process to refill vacancies on the game board;
    (d) detecting that a user has attained at least one objective of the first level by causing removal of at least certain user selectable game elements after one or more refill process;
    (e) accessing a first portion of the object to be rendered on the display, the first portion associated with the at least one objective of the first level;
    (f) rendering on the display (i) a visualisation of the first portion of the object and (ii) a game board for a subsequent level, wherein attainment of at least one objective of the subsequent level causes a subsequent portion of the object to be accessed.

According to a sixth aspect of the present invention, there is provided a non-transitory computer readable medium having stored thereon computer instructions which when executed by a processor in a computer device having a display cause the following steps to be carried out:
  (a) rendering on the display for a first level a game board comprising a plurality of user selectable game elements of at least two types;
  (b) detecting that a user has caused at least two user selectable game elements of the same type to be removed by engaging with at least one of the user selectable game elements prior to its removal;
  (c) executing a refill process to refill vacancies on the game board;
  (d) detecting that a user has attained at least one objective of the first level by causing removal of at least certain user selectable game elements after one or more refill process;
  (e) accessing a first portion of an object to be rendered on the display, the first portion associated with the at least one objective of the first level;
  (f) rendering on the display (i) a visualisation of the first portion of the object and (ii) a game board for a subsequent level, wherein attainment of at least one objective of the subsequent level causes a subsequent portion of the object to be accessed.

According to a seventh aspect of the present invention there is provided a computer device comprising:
  one or more processors; and
  a user interface comprising a display;
  the one or more processors being configured to
  render on the display a game level in which a game board comprises a plurality of user selectable game elements of at least two types;
  detect that a user has caused at least two user selectable game elements of the same type to be removed by engaging with at least one of the user selectable game elements prior to its removal;
  execute a refill process to refill vacancies on the game board after the game elements have been removed;
  detect that a user has made a contributing game move which contributes towards at least one objective of the game level;
  access, from a store holding at least first and second portions of an object, the first portion, wherein the first portion is associated with the at least one objective of the game level, and
  render a visualisation of the first portion of the object on the display and updating the visualisation responsive to detection that the user had made at least one contributing game move.

According to an eight aspect of the invention there is provided a method of controlling a display in a computer device, the method comprising:
  rendering on the display a game level in which a game board comprises a plurality of user selectable game elements of at least two types;
  detecting that a user has caused at least two user selectable game elements of the same type to be removed by engaging with at least one of the user selectable game elements prior to its removal;
  executing a refill process to refill vacancies on the game board after the game elements have been removed;
  detecting that a user has made a contributing game move which contributes towards at least one objective of the game level;
  accessing, from a store holding at least first and second portions of an object, the first portion, wherein the first portion is associated with the at least one objective of the game level, and
  rendering a visualisation of the first portion of the object on the display and updating the visualisation responsive to detection that the user had made at least one contributing game move.

According to a ninth aspect of the invention there is provided a non-transitory computer readable medium having stored thereon computer readable instruction which when executed by or more processor carry out the step of the afore-defined method.

According to a tenth aspect of the present invention there is provided a computer device comprising:
  one or more processors; and
  a user interface comprising a display; the one or more processors being configured to
  render on the display a game level in which a game board comprises a plurality of user selectable game elements of at least two types;
  detect that a user has caused at least two user selectable game elements of the same type to be removed by engaging with at least one of the user selectable game elements prior to its removal;

generate in the game board a special game element which when activated causes a first defined group of game elements on the game board to be removed;

detect an association between the special game element and at least one of first defined group of the the game elements; and generate at the location of the at least one associated game element a second special game element which when activated caused a second defined group of game elements to be removed.

The one or more processor may be further configured to execute a refill process to refill vacancies on the game board after the game elements have been removed. The refill process may be executed after the special game element has been generated on the gameboard. Activation of the second special game element may be triggered without further user input, thus causing a cascade effect before a gameboard is reset for a subsequent move.

According to an eleventh aspect of the invention there is provided a method of controlling a display in a computer device, the method comprising:

rendering on the display a game level in which a gameboard comprises a plurality of user selectable game elements of at least two types;

detecting that a user has caused at least two user selectable game elements of the same type to be removed by engaging with at least one of the user selectable game elements prior to its removal;

generating in the gameboard a special game element which when activated causes a first defined group of game elements on the gameboard to be removed;

detecting an association between the special game element and at least one of the first defined group of game elements; and generating at the location of the at least one associated game element a second special game element which when activated caused a second defined group of game elements to be removed.

According to a twelfth aspect of the invention there is provided a non-transitory computer readable medium having stored thereon computer readable instructions which when executed by one or more processor carry out the steps of the foregoing method.

According to thirteenth aspect of the invention there is provided a computer device comprising:

a display configured to display a visual world of a computer implemented game, said visual world comprising a plurality of objects, at least one of said objects being selectable by a user at a given time;

a user interface configured to receive a first user input which selects at least one of said selectable objects in a currently displayed part of said visual world; and at least one processor configured in response to the selection of said at least one object to cause the display to display a game board together with a background, said background being provided from image data used to provide at least a part of said visual world, said game board comprising a plurality of user selectable game elements, said processor being configured to receive user input interacting with said plurality of user selectable game elements and to determine if a goal associated with said game board has been satisfied.

According to a fourteenth aspect of the invention there is provided a method of controlling a display in a computer device, the method comprising:

rendering on the display a visual world of a computer implemented game, said visual world comprising a plurality of objects, at least one of said objects being selectable by a user at a given time;

receiving at a user interface a first user input which selects at least one of said selectable objects in a currently displayed part of said visual world; and in response to the selection of said at least one object, causing the display to display a gameboard together with the background, said background being provided from image data used to provide at least the part of said visual world, said gameboard comprising a plurality of user selectable game elements, the method further comprising receiving user input interacting with said plurality of user selectable game elements and determining if a goal associated with said gameboard has been satisfied.

According to a fifteenth aspect of the invention there is provided a non-transitory computer readable medium having stored thereon computer readable instructions which when executed by one or more processor carry out the steps of:

responsive to the selection of at least one object displayed in a visual world of a computer implemented game on a display, causing the display to display a gameboard together with the background, said background being provided from image data used to provide at least a part of said visual world and said gameboard comprising a plurality of user selected game elements; and receiving user input interacting with said plurality of user selectable game elements and determining if a goal associated with said gameboard has been satisfied.

In some embodiments, computer devices as defined hereinabove may include electronic storage media holding computer readable code to be executed by the one or more processors.

DETAILED DESCRIPTION OF THE INVENTION

Figure 1:
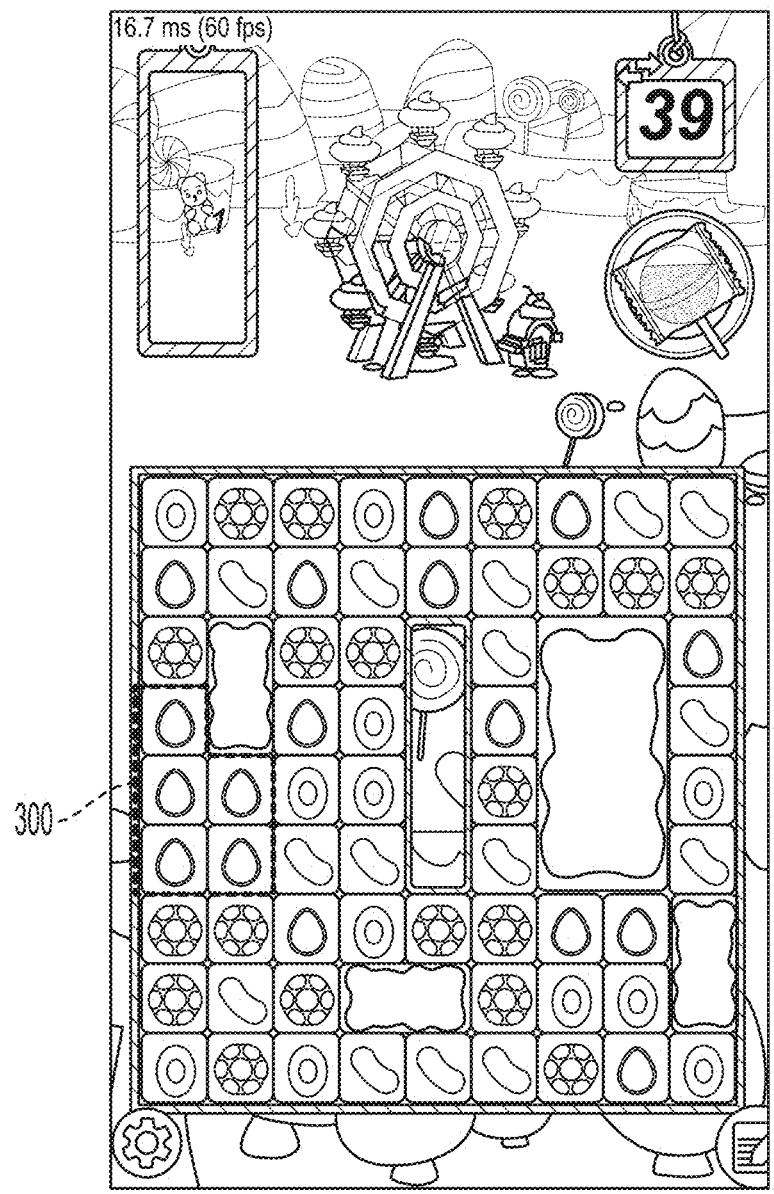
FIG. 1 shows an example of a clicker game.

The present disclosure describes a technique for allowing users of a game to create their own environment in which the game is played. The virtual environment, or world, is generated as users progress through levels and/or achieve goals. In particular, a user can cause objects to be rendered in the virtual environment based on their achievement of objectives in game levels, where the game levels are playable on a game board of selectable game elements of different types. The basic game mechanic may be a 'clicker' or 'switcher', where the user can cause game elements of a matching type to be removed from the board by strategic selection.

The present disclosure also describes a technique for combining the effects of special game elements, herein sometimes referred to as boosters, on a game board during game play. The technique may be used as part of the process of removing game elements from the game board during game play.

The terms user and player are used interchangeably throughout this document and no specific meaning is intended using one or the other unless the context suggests otherwise.

In the following description of various implementations of the invention, reference is made to the accompanying drawings which form part thereof, and in which is shown by way of illustration various implementations in which the invention may be utilized. It is to be understood that the other implementations may be utilized, and structural and functional modifications may be made without departing form the scope of the present invention.

The techniques described herein can be deployed in many different gameplay architectures. For example, a computer game can be implemented as a computer program that is stored and runs entirely locally on the processor of a PC, games console, tablet or mobile telephone or other computing device. The game can be implemented solely as a computer program that is stored and runs entirely on one of many processors in a remote server, and data streams or updates are supplied to the client device (e.g. tablet, smartphone, etc.) to enable the client to render and display graphics and sounds; this 'web services' approach is increasingly common.

Another possible infrastructure is a hybrid one, in which back-end servers handle some elements of the gameplay, and for instance a Java game applet is provided to client devices and it is the locally running Java applet that generates the graphics/sounds/user interaction for gameplay on the player's client device. Some data may be fed back to the back-end servers to enable scoring, interaction with other players and cross-platform synchronisation. Generally, the techniques described in this specification are not specific to any one game architecture but can be deployed on any suitable game architecture.

The game can be implemented allowing a user to interact with it in different ways depending on the capabilities of the device which the user is accessing the game with. A user can interact with the game through using a touch screen where the user can select and/or move elements on the game board with a finger or for instance with a stylus. The game can also be played with a pointing device such as a mouse or other interaction devices such as keyboard.

Mobile devices may have a touch screen interface where the player can interact with the game using a finger or a pointing device such as a stylus. Some mobile devices have hard keys that complement the touch screen interface. Such hard keys may be in the form of a button or in the form of a joystick type of interaction.

In implementations where some or all elements of gameplay are executed on a remote server, users may be able to share their gaming experiences with other users. They may, for example, be able to share their personal virtual environments which they generate through game play. Users may be able to choose which other users to share their environment with, for example their friends on a social media platform such as Facebook. This gives a social aspect to the game.

The following describes an implementation using a 'clicker' mechanic where groups of 2 or more matching objects (referred to in this document as blocks or game elements) are selected and automatically removed. FIG. 1 shows an example of a clicker game where a group of five game elements 300 of the same kind is highlighted using a dashed line. This group can be clicked and removed.

The following sections will refer to a game with a clicker mechanic. The ideas explained may also be implemented for games with other mechanics.

To exemplify the invention, one particular game will now be described. It will be evident that the features described herein may be applied in many different games.

Candy Cubes is an action puzzle game created by King.com. A player can make their way through a variety of levels in this clicker style adventure with the ultimate goal of creating his own 'Candy World' to play within, which is achieved by successfully passing levels.

The described game belongs to the clicker genre. To play the game, a player clicks on any group of two or more touching blocks of the same colour, this will remove them from the game board. In the implementation of this game, new blocks may or may not appear on the game board depending on the particular area of the board. This encourages the player to think more strategically on how to identify a block to select to remove a group of existing blocks. Identifying as many matching blocks as possible to select in one click will give higher points.

Once removed, any blocks above the cleared combination fall down to fill the gaps created by the removed blocks. In some embodiments, this is with the exception of the block that was clicked on, as described below. A refill process fills the vacancies which have been created with new blocks.

In Candy Cubes, the user is able to create his own world. The world he creates defines the levels and/or gameboards he is able to play. Each independent user can create a world unique to him, such that the appearance of the world differs for each user.

The user's world is presented to him on the display of his user device in a world view (referred to as an environment view). The user uses the world to navigate through the different levels of the game. However, the user has control over the levels he plays, rather than having to follow a predetermined path or sequence of levels. This allows each individual user to play a unique sequence of levels, as determined by the world he has created for himself.

Figure 2:
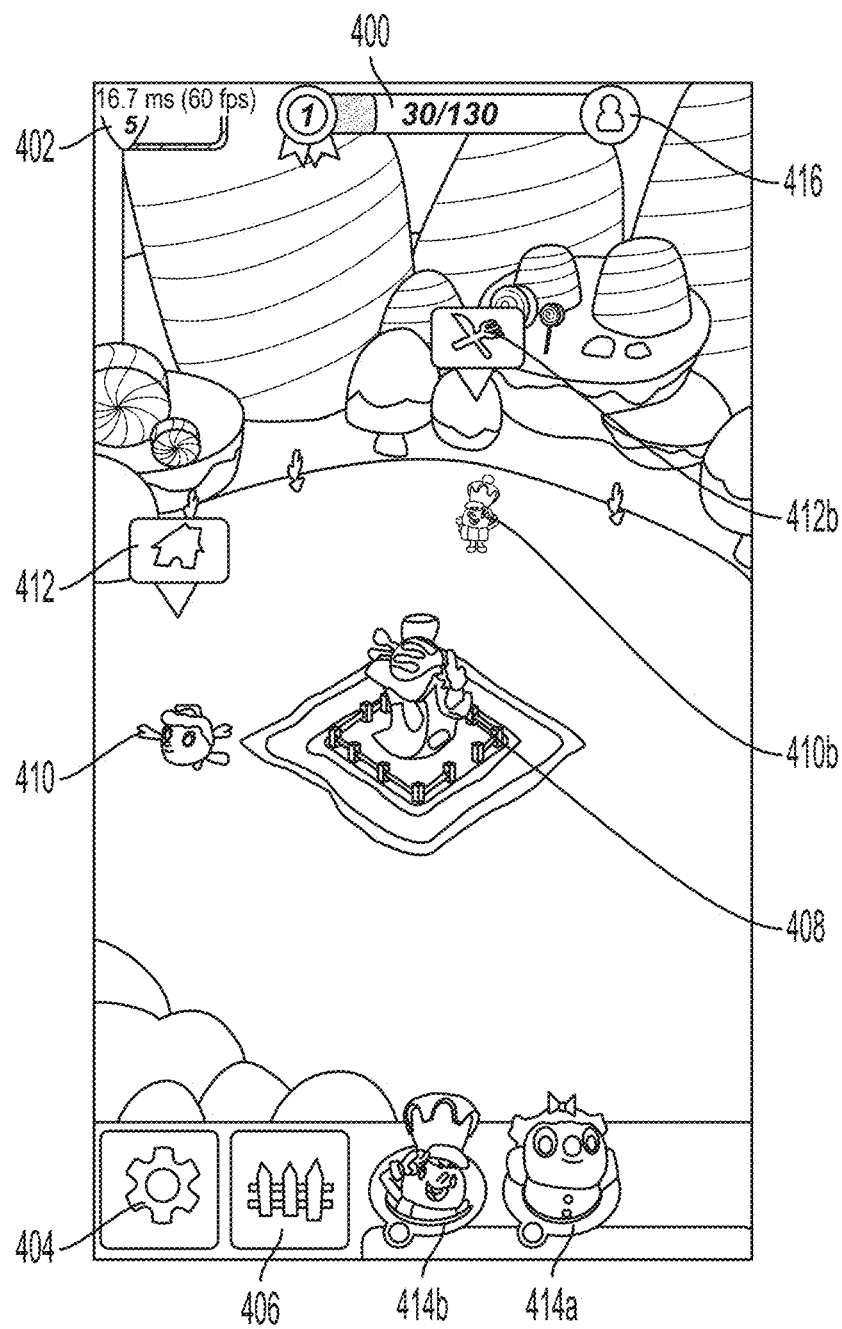
FIG. 2 shows an example of a virtual world created by a user.

FIG. 2 shows an example of an environment view of the world created by a user at a point in time as displayed on display 184. A house 408 has been generated in the world as a result of the user completing a story associated with that building, as discussed later. The user can decided where to place the house 408 on the map of the world.

A population bar 400 can be seen at the top of the display. This tracks the progression of the user through the section of the map he is currently playing in. His progression here is tracked in terms of the population of the section of the map. The user is given a target number of people to be occupying the section of the map. He achieves this by generating buildings. Some buildings may be associated with a larger population than other buildings. For example, public buildings may be associated with larger numbers of people than houses. The user must complete a section in order to progress to the next section. Each section of the map may be associated with a difficulty level, such that the difficulty level increases as the player moves from one section to another. The player may have to complete a certain number of levels or collect a predefined number of points in order to progress to the next section.

The user is given a number of lives at the beginning of the game. The number of remaining lives is indicated by the lives counter 402. This has the total number of lives the user has left indicated, as well as a bar to show the relative number of lives. If the user fails a level, he loses a life, and this will be indicated in the lives counter 402.

Settings button 404 allows the user to change the settings of the game, such as the sounds generated during game play, by displaying a user menu to the user.

During game play, the user may be awarded decorations for, for example, collecting a predefined number of points in a level. Decorations may be, for example, street lamps, cars, animals, etc. which the user adds to the world he creates. When a decoration is awarded to the user, it is stored in decorations button 406 until the user decides the place the decoration on the map.

The user can be identified using user icon 416. The user may be able to assign himself a photograph, avatar, animation, or other icon to indicate who he is. This may, for example, be associated with a user profile of the user.

The user may be able to view at least a part of the three dimensional environment by interacting with the user interface. In response to this interaction, the device is configured to change a camera angle of the displayed image. The user may be able to change a camera angle (for example by swiping the touch screen) and/or zoom in or out (for example by moving two fingers towards or away from each other on the touch screen). It should be appreciated that in other embodiments, any other suitable mechanism may be used to receive user input which is used by the at least one processor to control the part of the world which is displayed and/or the angle from which the world is reviewed.

Figure 15:
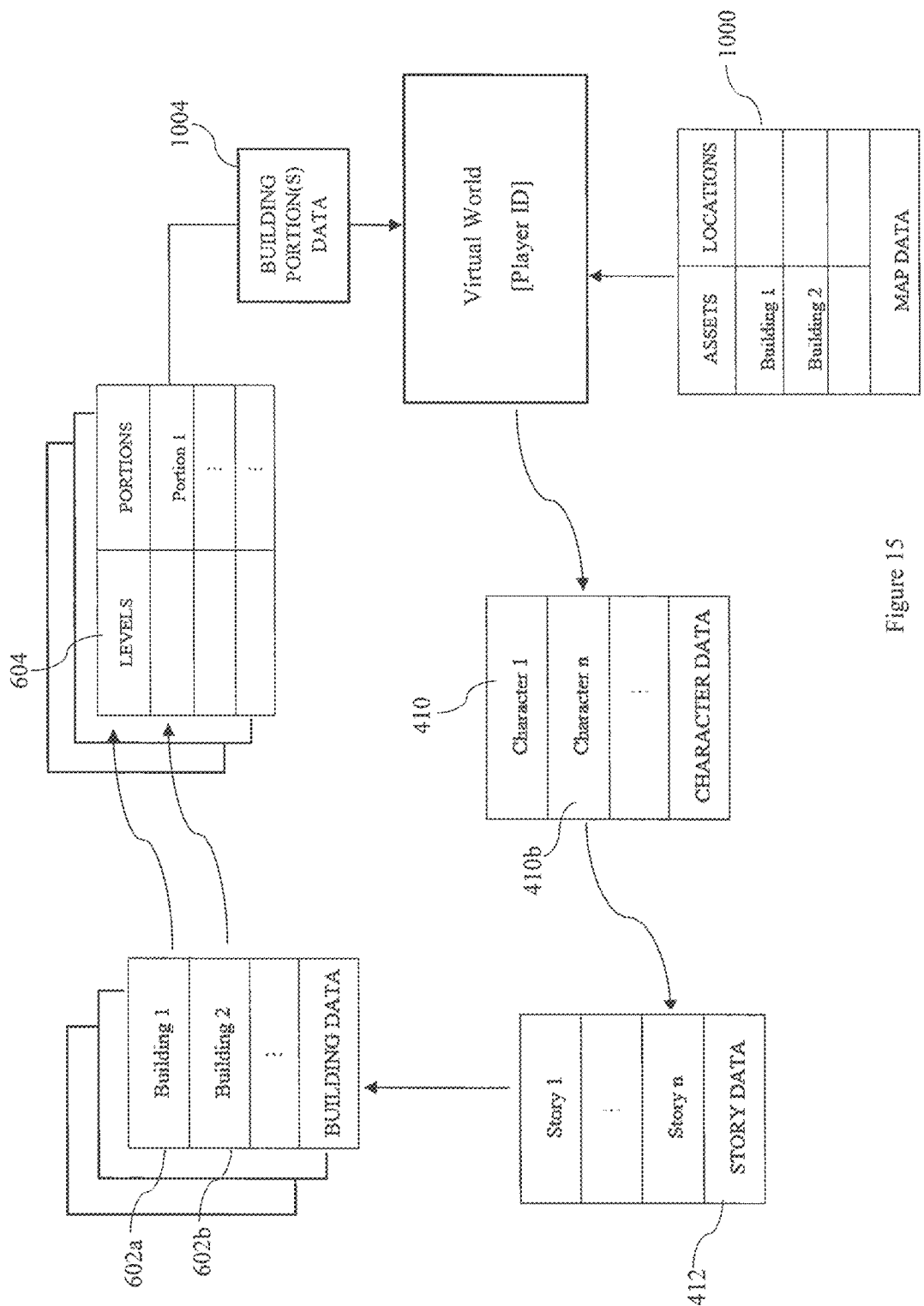
FIG. 15 shows an example of a memory structure for storing building data.

To create buildings for the world, the user must complete a predetermined number of levels. Reference is also made here to FIG. 15 which shows an example of organisation of the data in memory. To access the levels, the user selects a character 410 from the world. Each character 410 has a different story associated with it. This story defines the type of building which is generated by completing the set of levels associated with the character 410. The type of building to be created is indicated in the story bubble 412 which is shown above the character 410. For example, the character 410a is associated with a story which results in the user building a house, as shown in story bubble 412a, whereas character 410b is associated with a story which results in the user building a restaurant, as indicated by story bubble 412b.

Character icons 414 are shown at the bottom of the display. These correspond to the characters 410 shown on the map. The characters presented to the user for him to choose from may depend on the buildings already created in his world. For example, if the user has played multiple stories to create houses, he may be presented with characters which are associated with amenity type buildings, such as restaurants or funfair rides. In addition, the number of characters presented to the user for him to choose from may be dependent on his progression thought the map section. For example, he may be presented with more characters as he progresses.

To select a story to play, the user can select any of the character 410, the story bubble 412, or the character icon 414. Once the user has selected which story to play, he is taken to the story.

Figure 3:
FIG. 3 shows an example of a story.

For example, if the user selects character 410b (character n), he is taken to the story (story n) associated with that character, as shown in FIG. 3. The character 410b explains the story in speech bubble 500. An audio of the words displayed in speech bubble 500 may be played.

Figure 4:
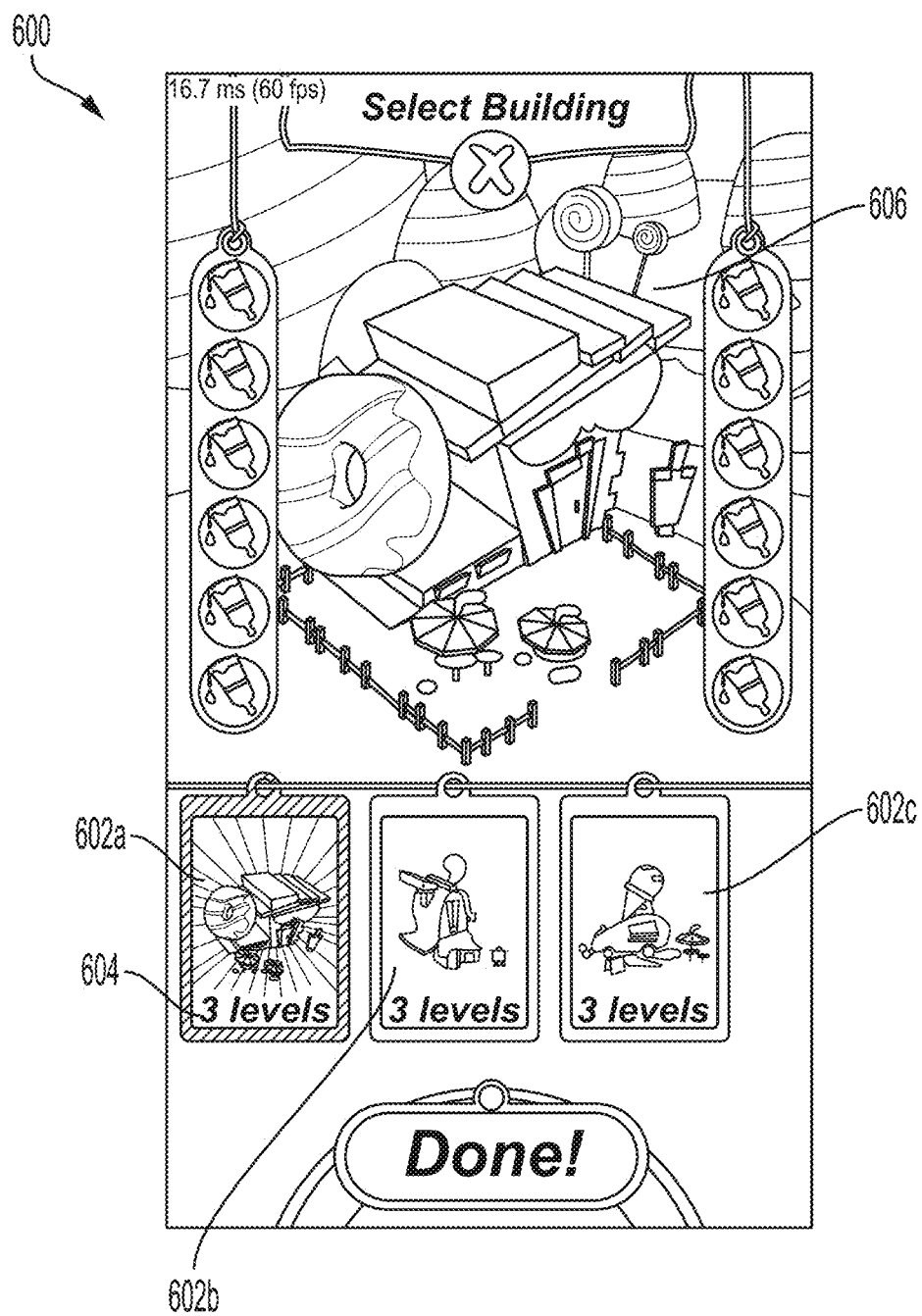
FIG. 4 shows an example of a building customisation page.

The user is than taken to the building customisation page 600 as shown in FIG. 4. The user is presented with different building options 602 which each correspond to the story. Note that there is a set of buildings options for each story. For example, building option 602a is a doughnut shop, building option 602b is a café, and building option 602c is an ice cream parlour. Each building option 602 has a number of levels 604 associated with it which indicates how many levels need to be completed for the building to be created in the world. Note that there is a set 8 of levels for each building option. These levels may be predefined or they may be randomly allocated as the user plays. The number of levels required to complete a building may be dependent on the size of the building, for example larger buildings may require the user to pass more levels than smaller buildings. The number of levels required for each of the building options 602 may be the same within each story or they may be different. The user can choose which building he would like to create by selecting one of the building options 602. The selected building is displayed in the building display area 606.

Figure 5:
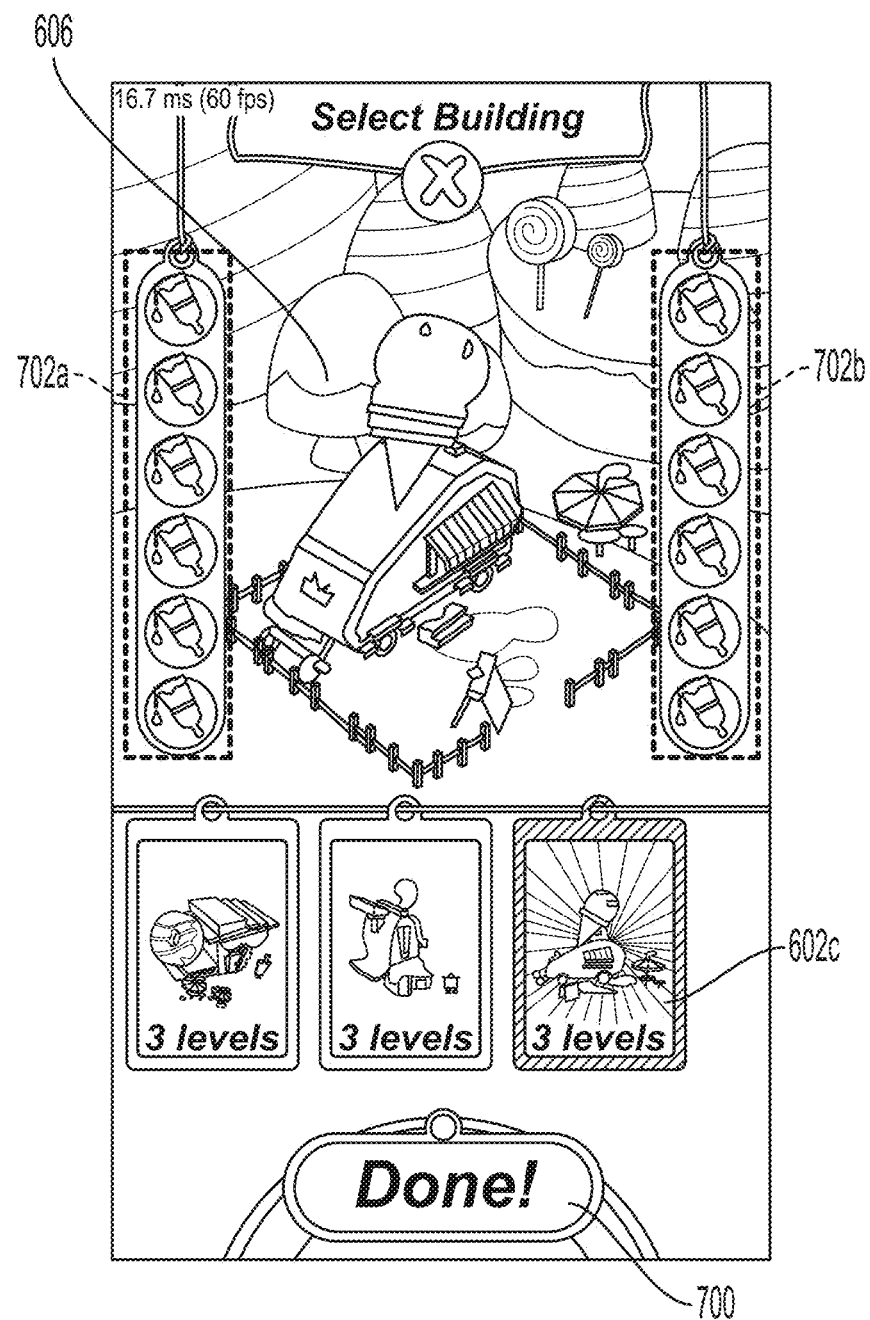
FIG. 5 shows an example of the user customising a building.

FIG. 5 shows an example of the user customising the building. He has chosen building options 602c, and the corresponding building is shown in the building display area 606. The user can customise the colours of various parts of the building using the colour selection bars 702a, 702b. When the user is happy with the building, he selects the done button 700 to proceed.

Figure 6:
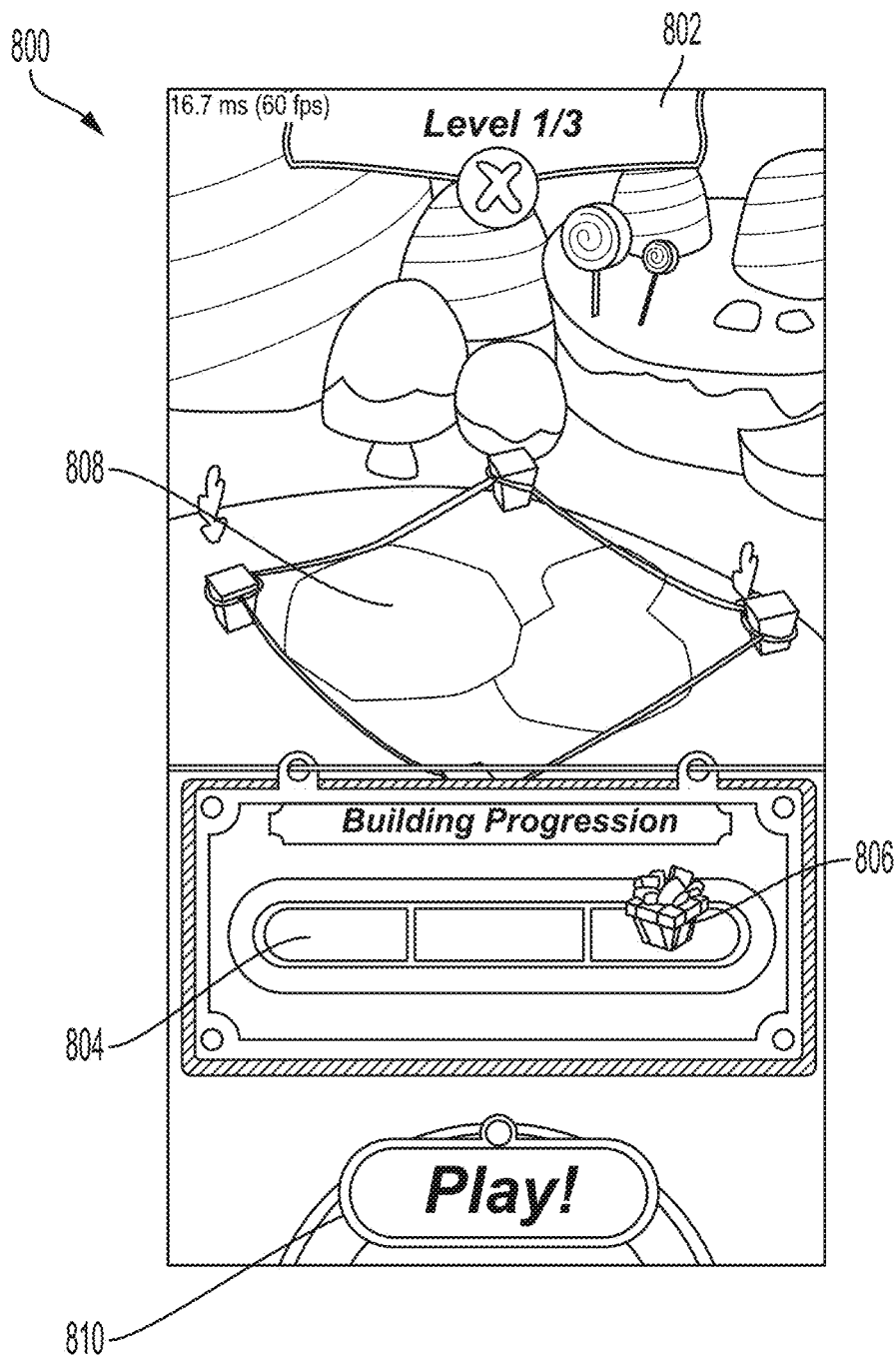
FIG. 6 shows an example of a progression page before the user has completed any levels in the story.

Before a player plays a level, the progression page 800 is displayed, as shown in FIG. 6. The progression of the player is displayed in a number of ways. The level progression 802 shows which level the user is about to attempts of the total number of levels in the story. As the user progresses through the levels, the progression bar 804 fills up. The building is displayed in building progression area 808. As the player plays the levels in the story, the building starts to be generated, such that, after each level in the story has been completed, a portion of the building is generated and displayed in the building progression area 808.

A present 806 can be seen on the progression bar 804. The location of the present 806 indicates at what point in the story the user will be rewarded the gift. The gift may be a decoration.

When the user is ready to play a level, he selects the play button 810 to proceed to the gameboard.

Figure 7:
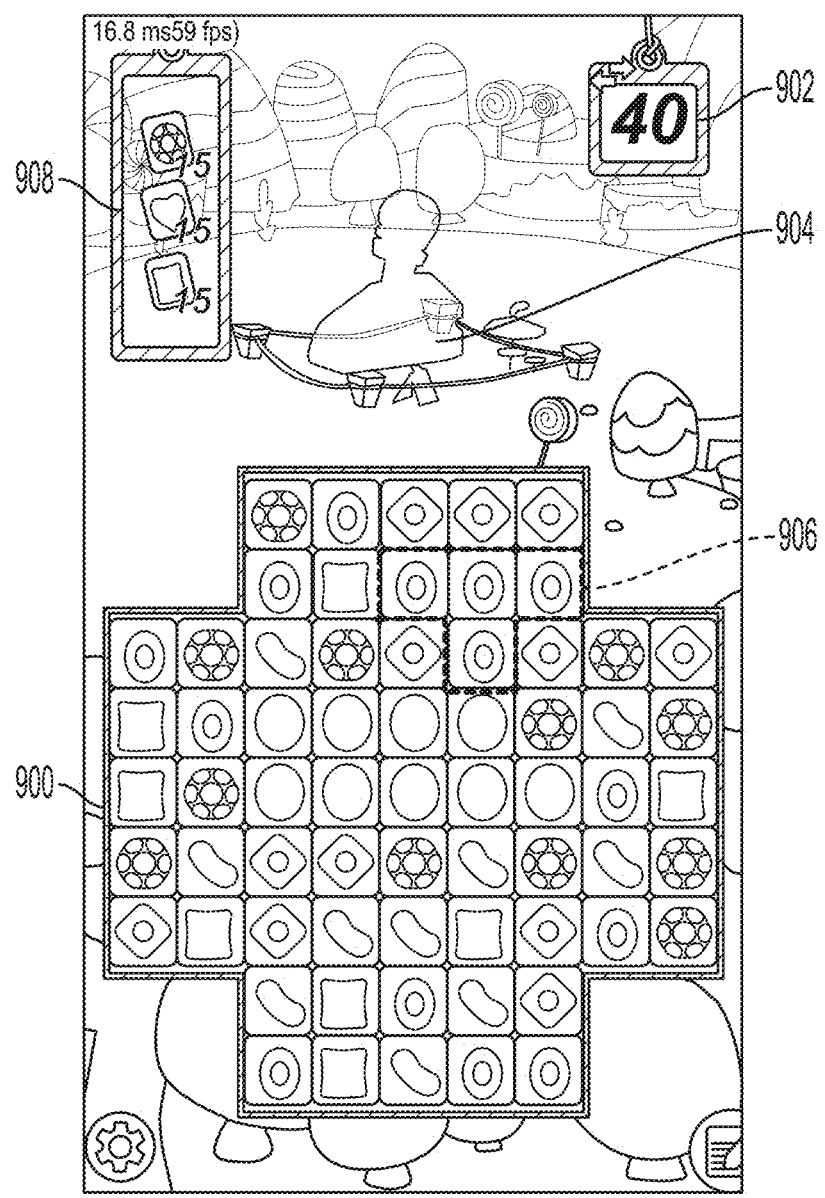
FIGS. 7-9 show an example of gameplay.

FIG. 7 shows an example of a game view. In a game view, the gameboard 900 is displayed. This is made up of a grid, with each element of the grid occupied by a game element. In some embodiments, not all of the grid squares of the gameboard are occupied by game elements.

The user is given goals for the level. These goals are presented in the goal board 908. In this example, the user needs to eliminate 15 purple game elements, 15 blue game elements, and 15 green game elements from the gameboard 900. It will be appreciated that other goals may be given to the user, such as collecting special game elements at the bottom of the gameboard 900 or exposing area of the gameboard 900.

The moves counter 902 shows how many moves the user has remaining to try to complete the level. When the user makes a play, the counter 902 reduces by one. The aim is for the user to achieve all of the goals indicated in the goal board 908 before he runs out of plays, so before the counter 902 reaches 0.

By giving the user goals, or objectives, to achieve in a given number of moves, the user is encouraged to think more strategically about the moves he makes in the game. He must remove certain game elements to achieve the objectives. For example, the player may be required to remove a certain number of elements of a particular type from the game board as described above. Alternatively, he may be required to remove game elements which obscure images behind the elements, so the player must remove elements positioned in certain areas of the game board. Another example of a goal is collecting special game elements, such as ice cream 1808 in FIG. 17D, at the bottom of the game board by removing elements from underneath the special game element. Again, in this example, the certain elements which are required to be removed are defined by their location on the game board rather than their characteristics.

An outline or ghosted version 904 of the building which is to be created by playing the story is shown. As the player makes plays which help achieve the goals, the outline 904 gets filled in such that the relative progression of the user towards completing the building is visualised. Moves which do not help achieve the goals do not upgrade the building.

The user removes blocks by selecting groups of two or more matching adjacent blocks, for example, group 906. The user selects to remove this group 906 by clicking on one of the blocks in the group 906.

Figure 8:
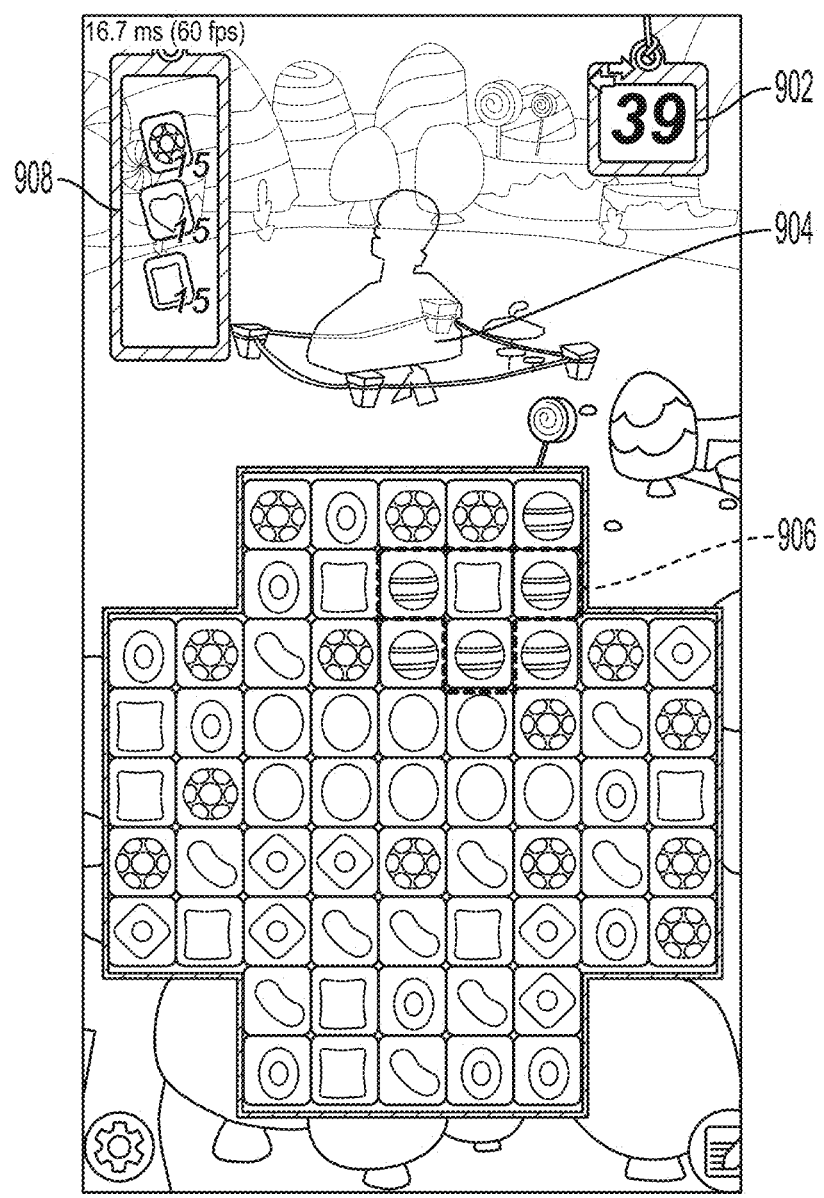

In FIG. 8, the blocks in group 906 have been removed, and the blocks from above have fallen down to fill the empty grid elements left by the removed blocks. The counter 902 has reduced by one. However, because there are no goals in this example which are associated with orange blocks, there have been no changes to the goal board 908 or the outline 904.

When game elements are removed from the board, the elements which were in the grid squares above the removed elements fall downwards to fill the spaces left by the block removal. This leaves some empty grid squares at the top of the game board 900.

In some instances, the grid squares previously occupied by the removed game elements will remain unoccupied. This may be the case if the user is, for example, given the goal of revealing an image hidden by the game elements. In this instance, the elements positioned above those removed by the player's move will not fill the unoccupied grid squares. The grid square may be marked as full even if unoccupied by a game element such that no game elements move to fill the grid square.

To fill the grid squares left unoccupied at the top of the game board 900, new game elements are spawned. The characteristics, for example colour and booster effects, of the game elements may be predefined or may be randomly allocated to the elements when they are spawned. If there are two or more empty grid squares in one column at the top of the game board, a first game element is spawned in the top gird square, which then falls down to the lowest empty grid square, before a second game element is spawned, again in the top grid square. This process continues until all of the grid squares in the column are filled.

It will be appreciated that the game elements may move in other directions. For example, elements may move from right to left or vice versa when grid squares are rendered unoccupied after block removal. Game element spawning occurs by the same method described above, but at the location of the empty grid squares at the edges of the game board.

Figure 9:
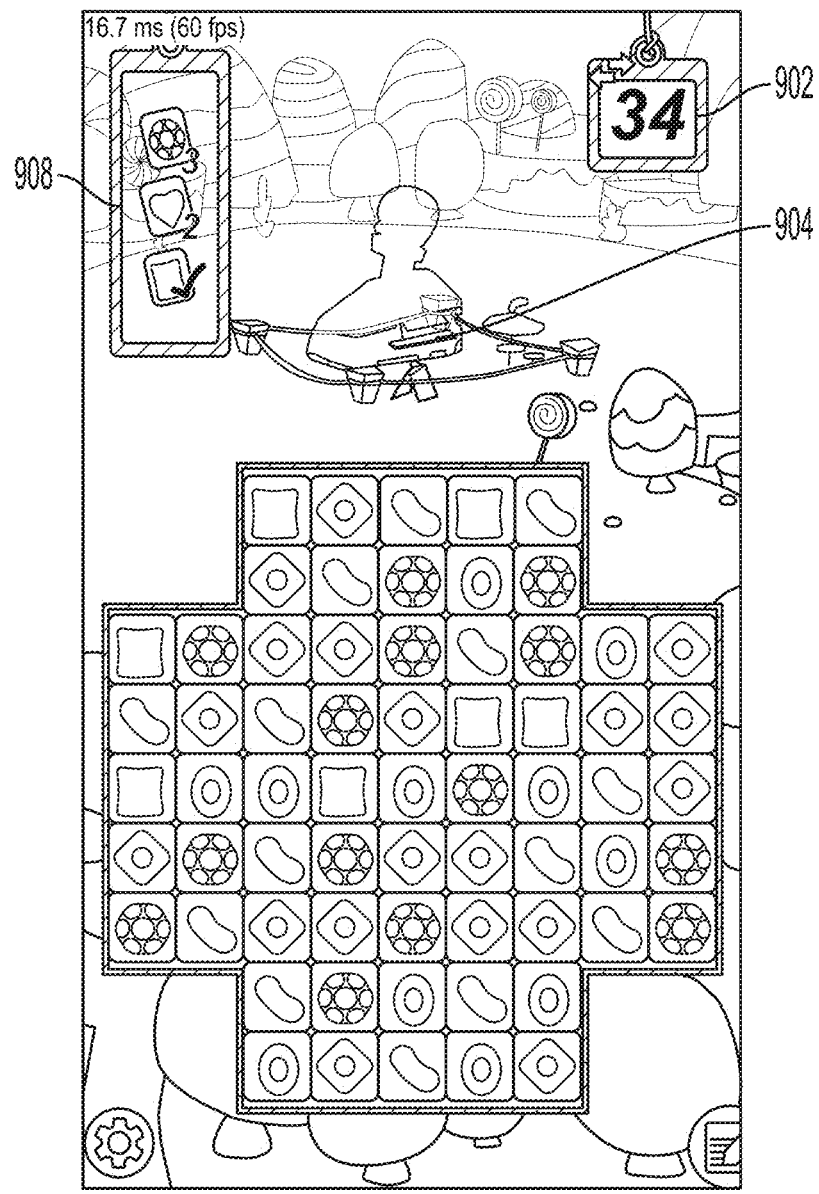

FIG. 9 shows the game play display after a further time in which the player has made five more moves, indicated by the number in the moves counter 902. The user has made progress towards completing the goals of the level as indicated by the changes to the goal board 908 and the upgrading of the building outline 904. It can be seen that the bottom part of the building outline 904 has been filled in, so the building is being built. Thus, the player can see his progress towards completing the building in real time.

If the user passes the level, he can progress to the next level in the story. His progress through the story can be seen on progression page 800 shown in FIG. 10. Since he has completed one of the three levels required to complete the story, one third of the progression bar 804 has been filled. His progression is visualized through the updated building in the building progression area 808. The level progression 802 shows that the user is about to play the second level, having completed the first.

The building is upgraded during game play by filling in the outline 904. However, the building progress is only updated at the end of every level. As such, the building is only updated if the user passes the level. If the user does not pass the level, the building progression is as it was before the user attempted the level. If the user had not passed level 1, for example, the progression bar 804 would still be empty, as would the building progression area 808. The level progression 802 would indicate that the user was to play level 1 again. As such, the progression page 800 would look like that of FIG. 6.

Figure 11:
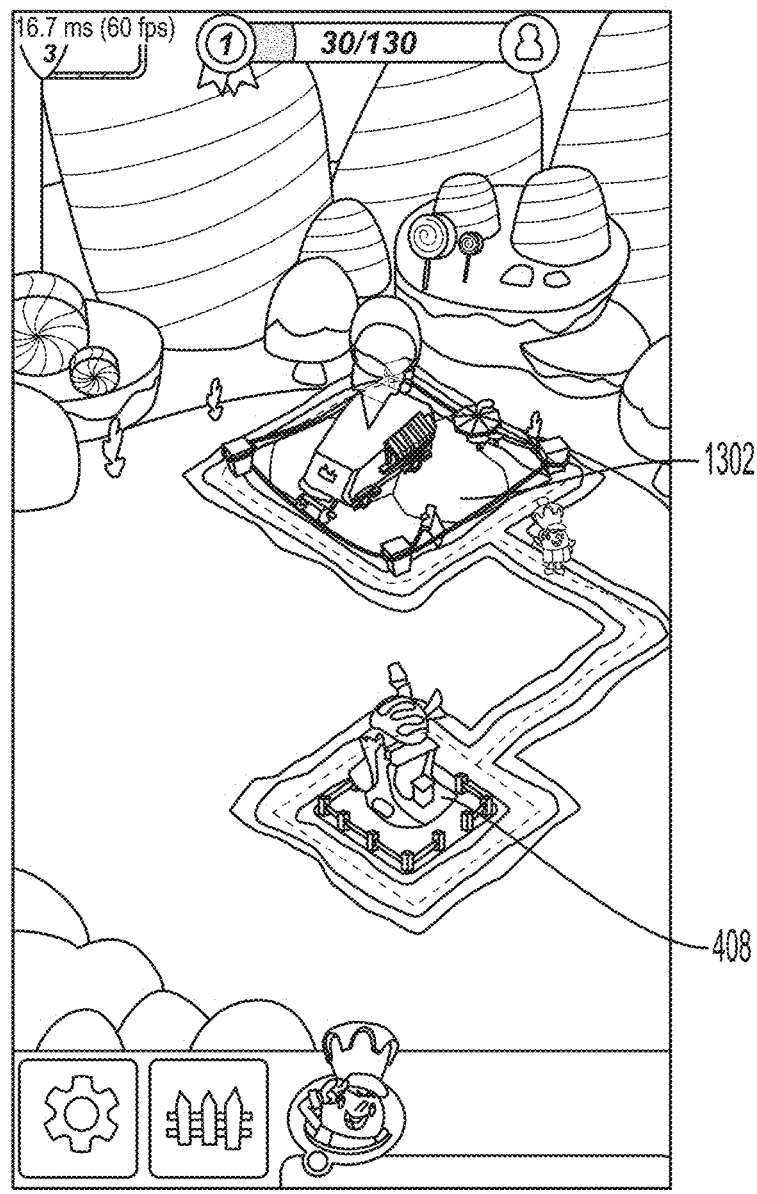
FIG. 11 shows an updated visualisation of the virtual world.

The progression of the user can also be seen on the map, as shown in FIG. 11. The house 408 can be seen along side the ice cream parlour 1302, which only shows the proportion of the building corresponding to the proportion of the levels passed in the story. Thus, there is matching between the completion of levels by the user and the augmentation of the world.

The user continues to play the levels within the story until he has completed the story, and thus created the full building associated with the story.

Figure 10:
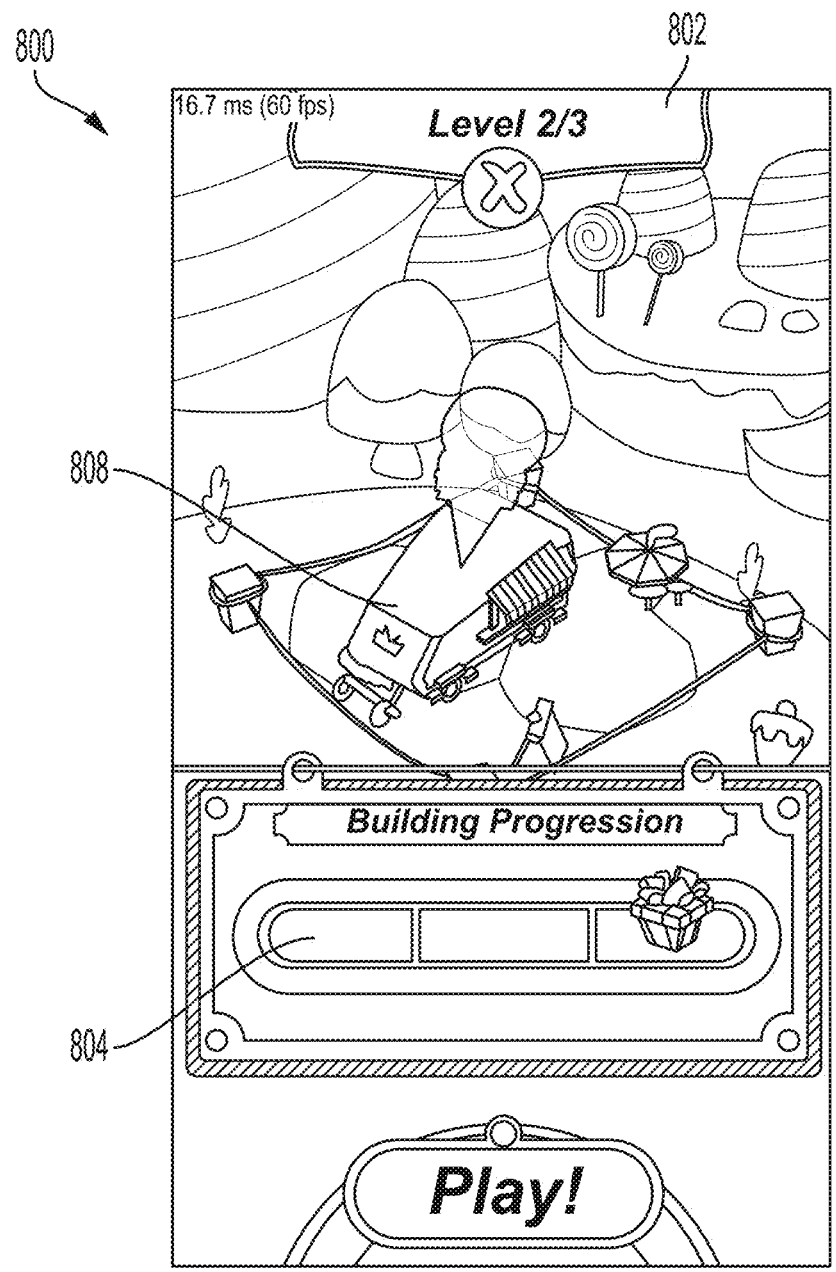
FIG. 10 shows the progression page after the user has completed a level in the story.
Figure 12:
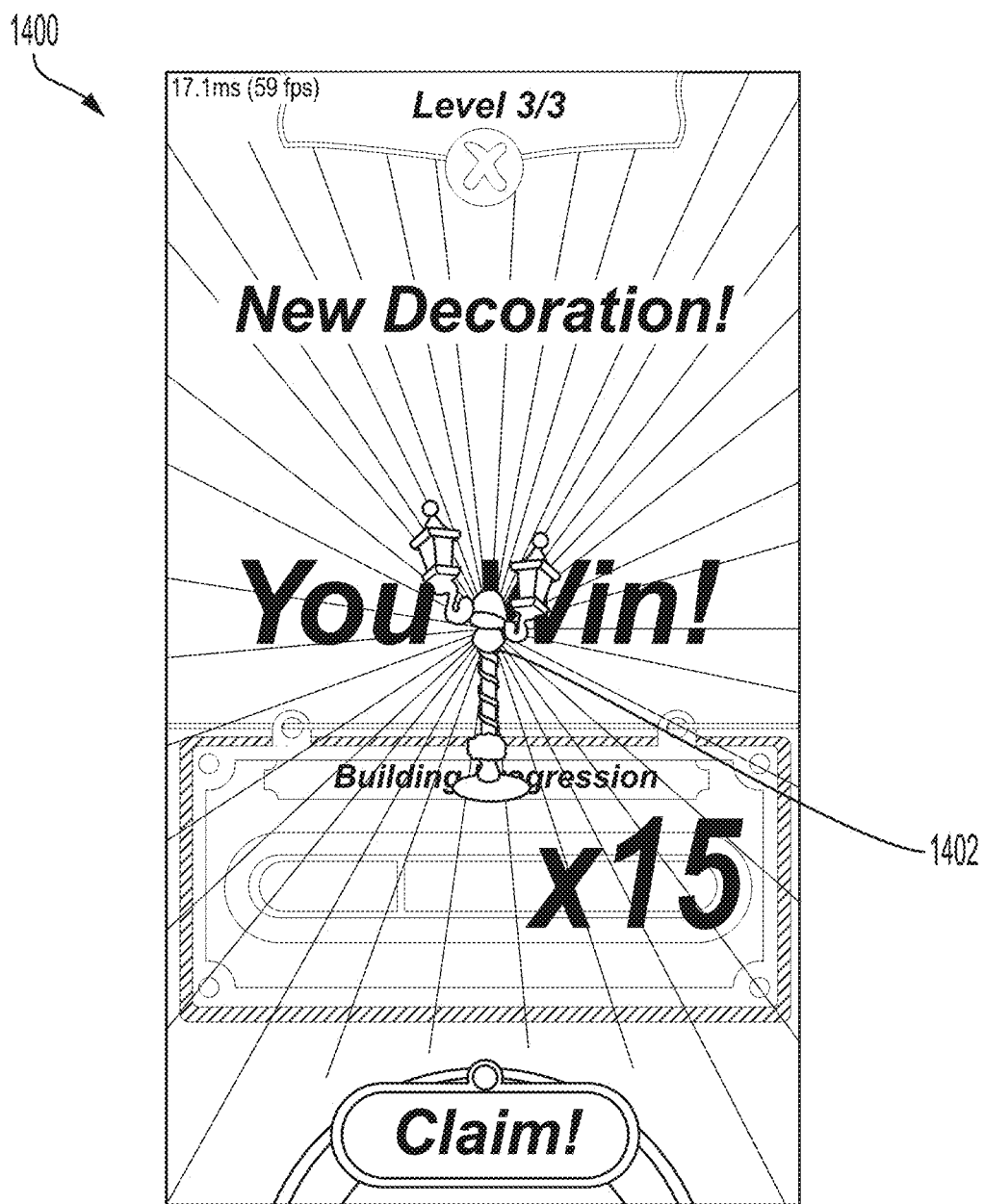
FIG. 12 shows an example of the user receiving a decoration.
Figure 13:
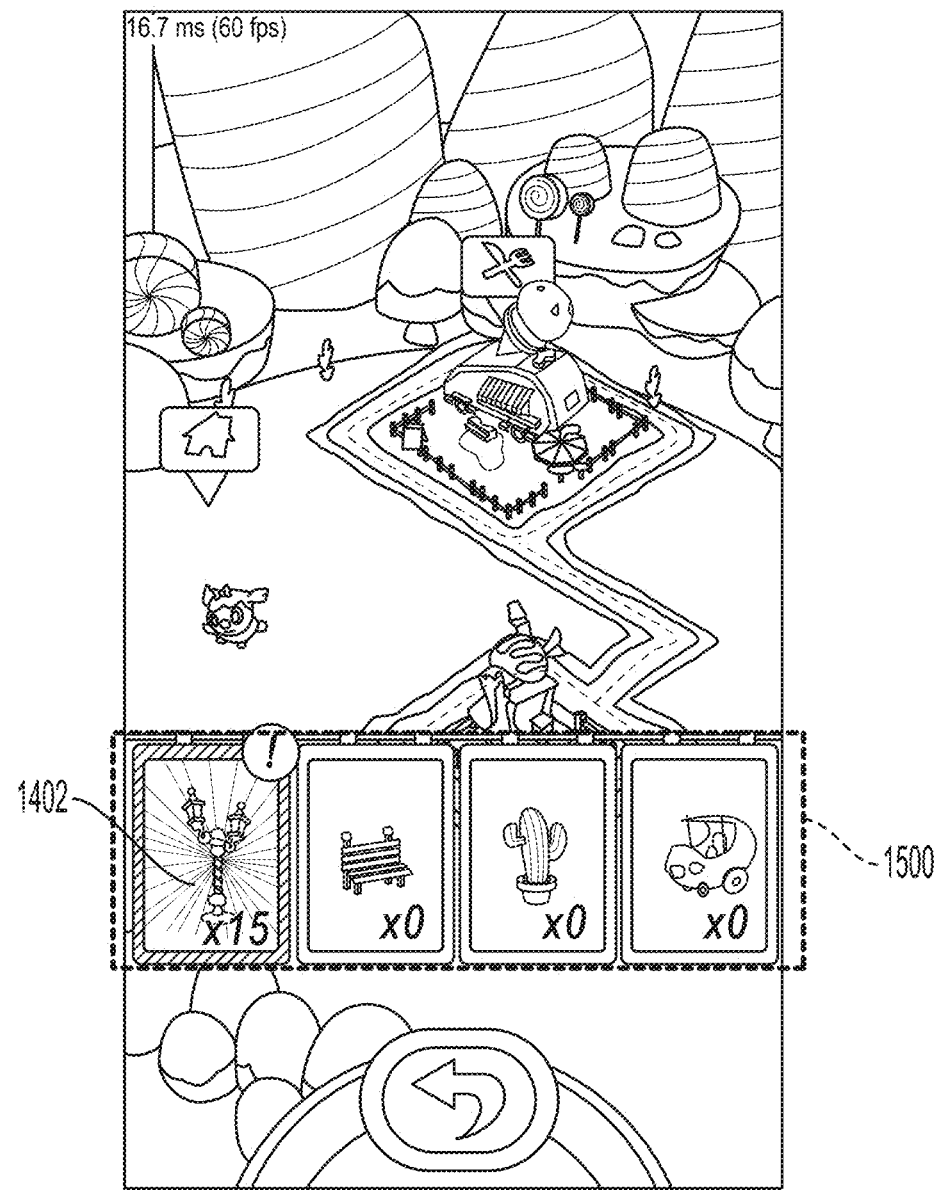
FIG. 13 shows a decoration menu.

In the example story followed above, the user receives a gift when he finishes the third level, as indicated by the present 806 in the third segment of progression bar 804 shown in FIGS. 6 and 10. When the player completes the level for which the gift is rewarded, the decoration screen 1400 is displayed to the user, as shown in FIG. 12. The decoration 1402 received is visualised on the screen 1400. Here, the user is receiving a lamppost. The decoration is then added to the decoration menu 1500, accessed using the decorations button 406 on the map display, as shown in FIG. 13. The decoration remains in the decoration menu 1500 until the user chooses to place the decoration on the map.

Figure 14:
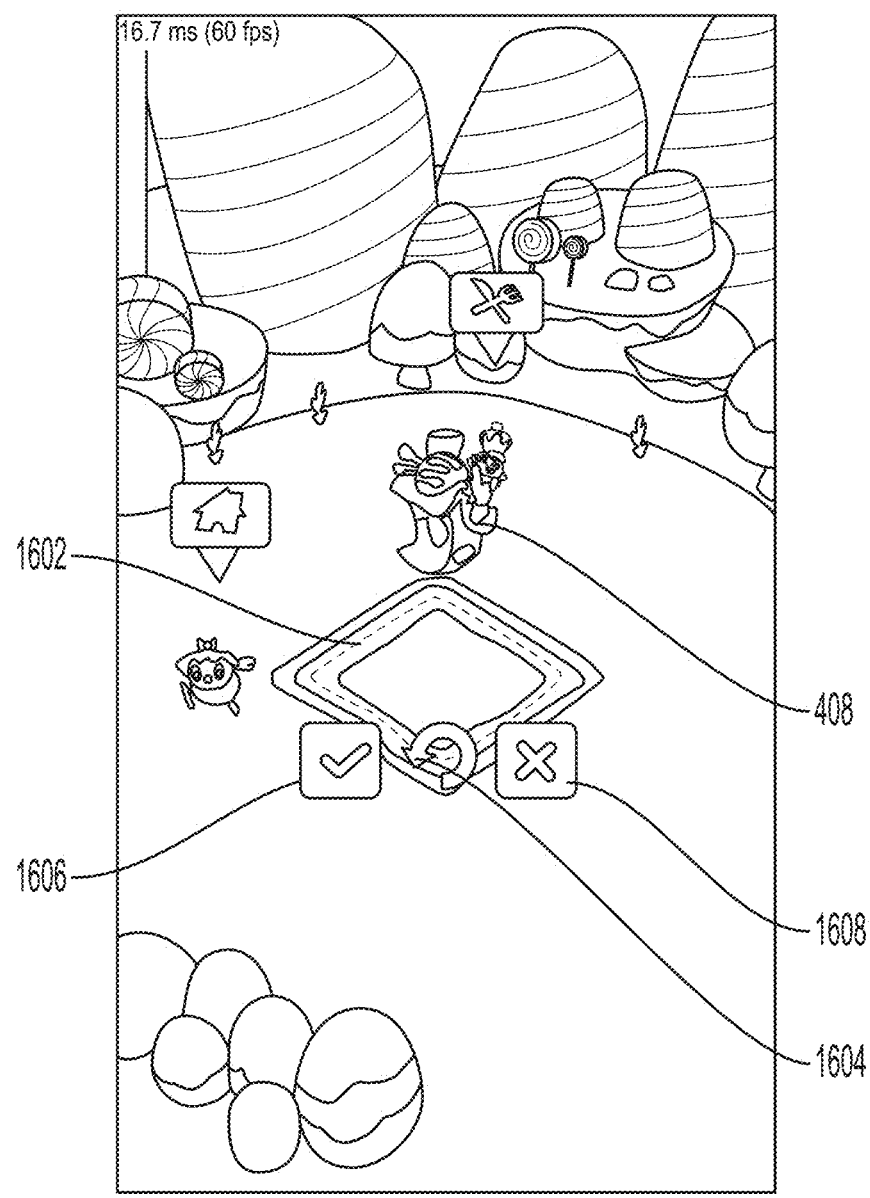
FIG. 14 illustrates how a user can move the buildings in the virtual world.

Once buildings and decorations have been created, the user is able to place them on the map in a location chosen by the user. That is, the building which was previously rendered as a visualisation in the game view may now be engages by a user in the environment view to make it move around. FIG. 14 shows an example of the user manipulating the house 408. FIG. 15 shows map data 1000 stored in memory which rerecords the location of each asset to be rendered in the environment view.

To activate the movable feature of the building, the user selects and holding down the building he wishes to manoeuvre for a predefined length of time. This renders the building movable by the user. The user may have to select a certain part of the building to activate this mode, or he may be able to select any part of the building. Portions of partially completed buildings may be moved around, as well as complete buildings.

The grid 1602 indicates the area on the map which will be occupied by the house 408. The user can drag the house 408 to different areas of the map to choose where to place it. The user can use the arrow 1604 to rotate the house 408 such that the orientation of the house 408 changes. When the user is happy with the location and orientation of the house 408, he selects the tick 1606 to place the house 408 in the location specified. If, however, the user wants to cancel the moving of the house 408, he selects the cross 1608. This method can be used for any building or decoration the user has created or received.

In some embodiments, it may be possible to manipulate the building on the map when it is part built, so when the user has only completed a portion of the levels in the story associated with the building. The proportion of the building generated and rendered to the user on the display is proportional to the progression of the user through the levels of the story, as described above. The user may be able to manipulate the building before any portions of the buildings have been generated, when it is visualised as an empty construction site. The area the building is to occupy is shown, along with the roads, but no portions of the building have been generated.

Roads are automatically generated around the buildings when they are generated in the virtual world. If there is more than one building in the section of the map the user is interacting with, roads connecting the buildings will also be automatically generated. When the user moves the buildings in the virtual world, the roads connecting the buildings are updated.

Figure 26:
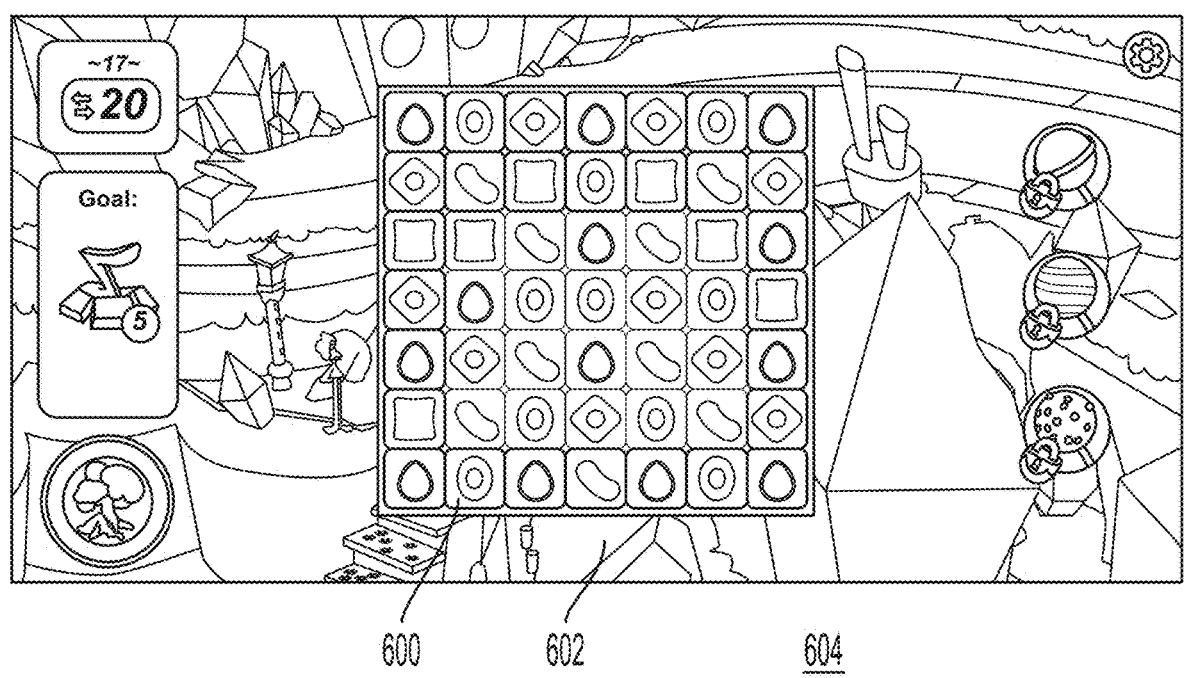
FIG. 26 shows an image displayed on the display of a game board.

In some embodiments, the device is configured to cause the display to display the game board superimposed over the image of the virtual world in which the user is playing, as shown for example in FIG. 26. This is to make playing the game associated with the game board part of the narrative associated with the traversing of the virtual world or environment. The size of the game board is such that it is possible to see a significant part of the virtual world.

In some embodiments, the game board 600 is opaque and superimposed over the image of the virtual world 602. In other embodiments, the game board is at least partially transparent so that the virtual world may be at least partially viewable through the game board. In some embodiments, the game elements on a game board may be opaque with the underlying game board transparent.

In some embodiments objects from the virtual world may move across at least a part of that virtual world and enter the game board where they could form part of the background of the game board or be rendered as a playable or non playable game element. In some embodiments, one or more game elements on the game board may "explode" and may impinge at least partially across the virtual world.

For example, they may spread partially into the virtual world and move across the virtual world to enter one or more subsequent game boards to be played, for example at a subsequent level.

In these ways, the virtual world and the game level can be part of the same game environment. This may address the technical challenge in providing user engagement particularly in the context of providing a narrative in the context of a game world while still retaining casual social gaming.

In some embodiments, the device is configured to use at least a part of the virtual world as a background to the game board when it is displayed. In some previous proposals, separate images are provided which are stored as a background for the game boards of one or more levels. This increases the amount of image data which needs to be created and/or stored. The device herein may be configured to use image data of the virtual world to provide the image data for the background which is displayed when the game board is displayed.

In some embodiments, when the user selects an object via the user interface in the currently displayed image of the virtual world, the device is configured to display the game board such that the currently displayed image of the virtual world provides a background. In this embodiment, the game board may be displayed in conjunction with the current part of the virtual world as a background.

In some embodiments, the device may be configured to modify a current view of the virtual world to provide the background to the game board. For example, the virtual world may be zoomed into, zoomed out of and/or the camera angle with respect to the virtual world changed. In some embodiments, a different part of the virtual world may be provided as a background to the game board.

In such embodiments, it is not necessary for there to be a separate set of images which are used when a game board is displayed or for that background data to form part of the game board file.

It should be appreciated that in some embodiments, the image data which is used to define the game board can be limited to the specific game board and does not require any image data for the background. This may reduce the amount of image data which is stored in a file for the game board.

It should be appreciated that the game board may be opaque, translucent or partially translucent as previously described.

Figure 27A:
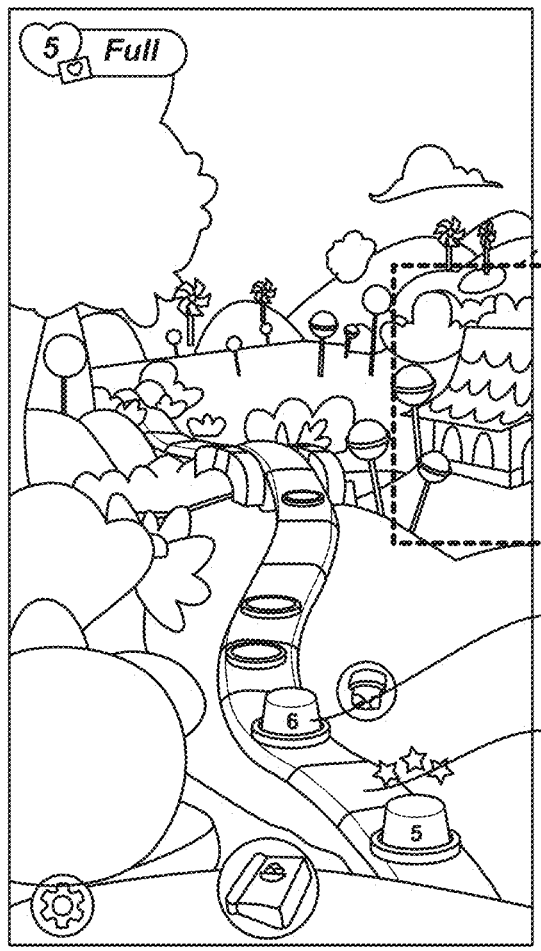
FIG. 27A show a different example of a game environment.
Figure 27B:
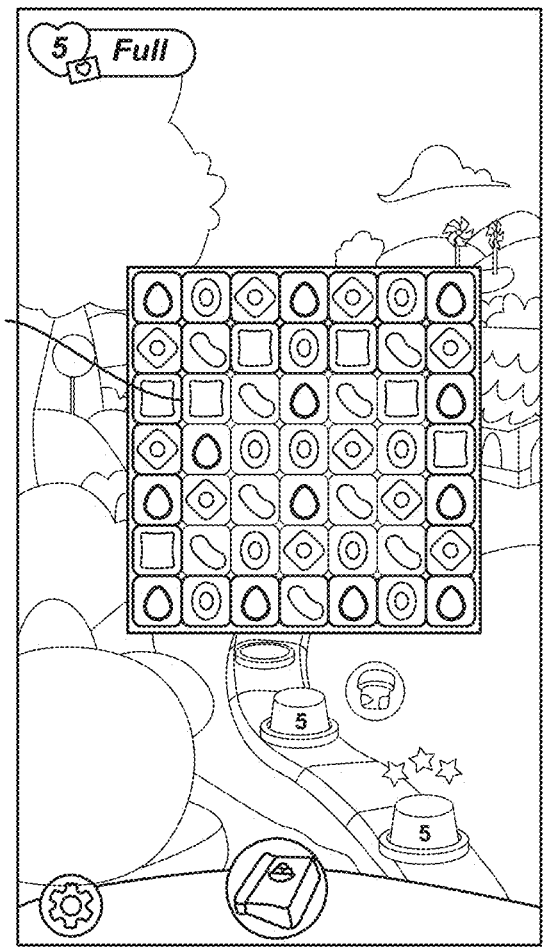
FIG. 27B shows an example of a game board imposed on a currently displayed image of the game world.

Reference is made to FIG. 27A and FIG. 27B which show a different virtual environment or virtual world to some of the previous examples. In this example, a so-called saga map 1206 is displayed. This can be seen clearly from FIG. 27A. In the saga map type format, individual nodes 1204 represent different levels. In order to progress to a next node or level, the goal of the associated game board of that level associated with a particular node needs to be achieved. The user's progress through the levels on the map may be apparent with the nodes associated with passed levels being displayed in a different manner from those nodes which are associated with levels which are yet to be passed.

In the example shown in FIG. 27B, a game board 1202 is displayed over a part of the saga map. For example, when the user selects via the user interface the node 1204, the device may be configured to cause the image displayed in FIG. 27B to be displayed. It should be appreciated that this image may be directly displayed responsive to selection of the node or there may be one or more intervening images displayed before the game board 1202 is displayed on the display. It should be appreciated that those one or more intervening images may provide an invitation for the user to play the game. For example, this may include a part of the image with which the user is able to interact using the user interface in order to get the game board shown in FIG. 27B to be displayed.

Figure 28A:
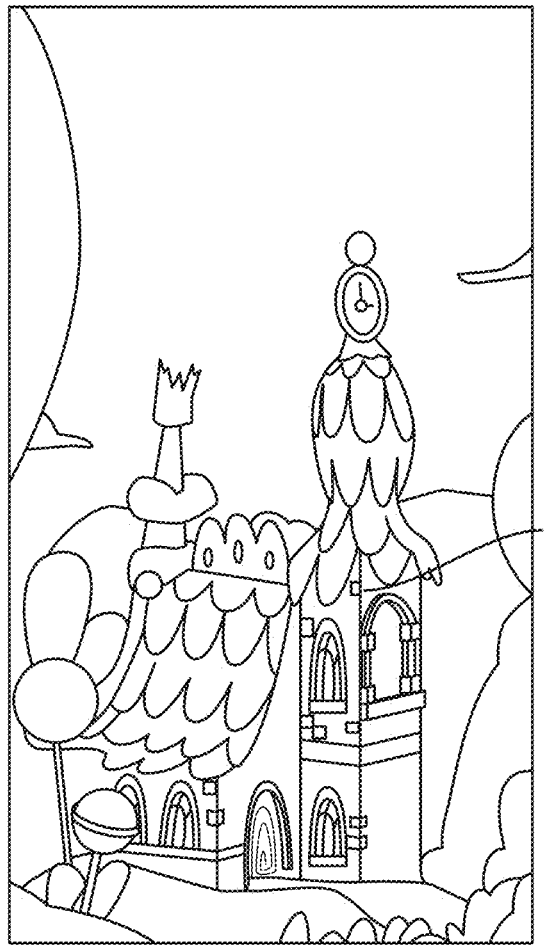
FIG. 28A shows an enlarged view of a house object from the game world of FIG. 27A.

Alternatively or additionally, the background to the game board may be provided by different parts of the virtual world. For example, as shown in FIG. 27A, there is a house 1200 provided in the virtual world. In the example shown in FIG. 28A this house 1302 may form the background for the game board. Thus a different part of the virtual world is used as a background for the game board.

Figure 28B:
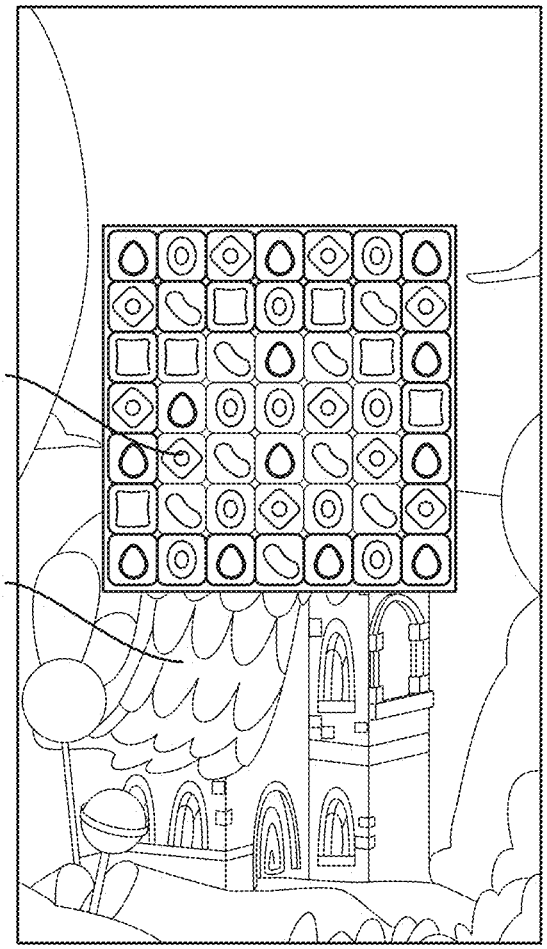
FIG. 28B shows an example of a game board imposed on the enlarged view of the house shown in FIG. 28A.

FIG. 28B shows the image which is displayed with the game board 1304 over the background of the house 1302.

It should be appreciated that the part of the virtual world which is used to provide the background may not even be seen in the current part of the game board which is visible when the user provides an input via the user input to cause the game board to be displayed.

As can be seen, the image data which is used to define the virtual world can be reused in order to provide a background to the game board.

In some embodiments, where the part of the virtual world which is currently displayed is used as a background to the game board, the part of the image which needs to be rendered can be reduced in that only the image of the game board needs to be rendered, the background having been already rendered. It should be appreciated that this may be the image of the game board itself or, as previously mentioned, the image of the game board (which is at least partially transparent) in combination with the underlying image of the virtual world.

A player may receive rewards, for example candies, for the buildings in the virtual world. Some buildings may be associated with different quantities of rewards. These rewards may be given to the user over a period of time. For example, the user may receive more candies per hour for a restaurant than for a playground ride, for which he receives more than for a house. There may be a strategic element to where the user places the buildings in the virtual world as he may receive more candies per time period if buildings are placed in certain locations relative to other buildings. For example, he may receive more candies if the restaurants are situated closer to the houses. Once the user has collected enough candies, he can exchange them for, for example, supplies for the virtual world. There may be a time delay between relinquishing candies and receiving the supplies.

By allowing the user to customise the buildings which are created for his world, and choose the location of all elements within the world, the user creates a unique world for himself to play the game in. This world is stored in memory 2406 with a player identifier so that it can be recalled for that player each time he rejoins the game. An example memory layout is shown in FIG. 15.

In some embodiments, it may be possible for users to share their world with other users, such that users can see and interact with the worlds created by other users. For example, the user may choose to share the world he has created with his friends on a social media platform such as Facebook.

Figures 16A, 16B:
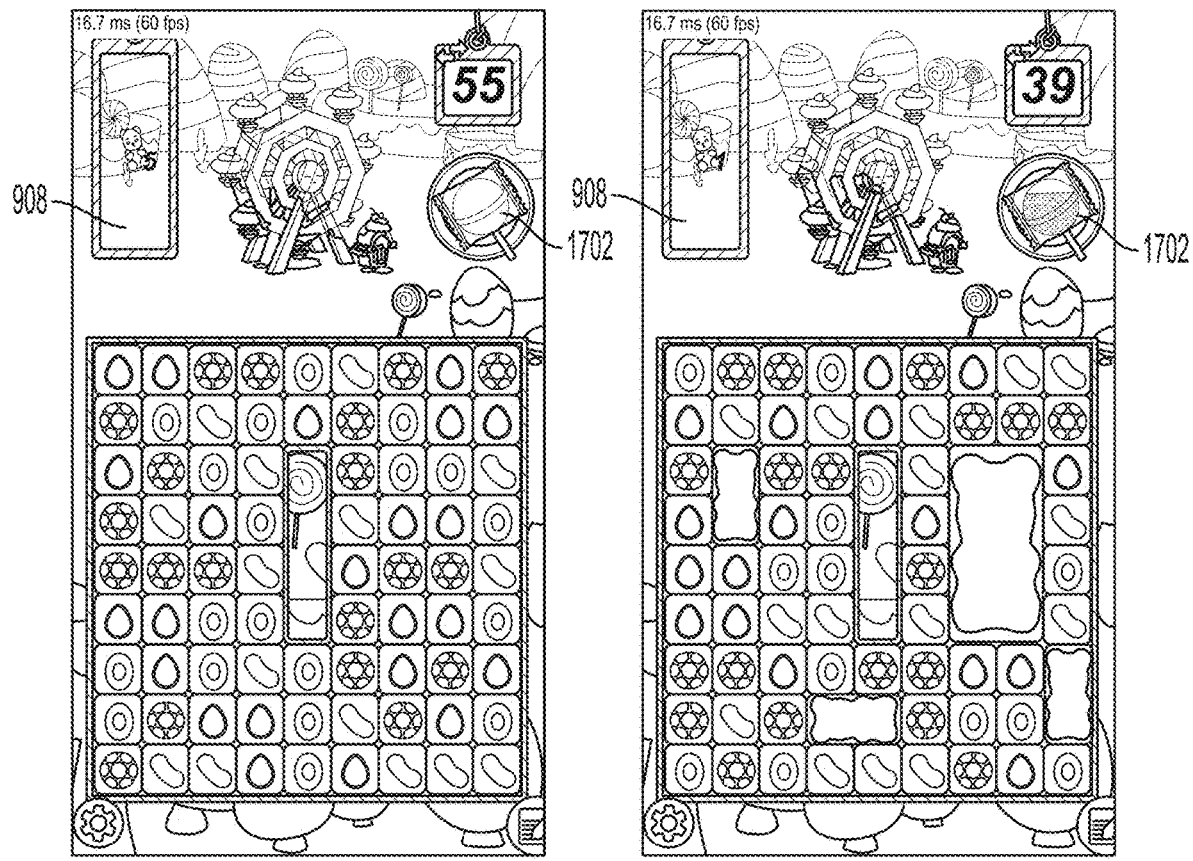
FIGS. 16A and 16B show an example of a lollipop hammer booster.

There are a number of special features available to the user during game play. FIGS. 16A and 16B show an example of the lollipop hammer feature. Lollipop 1702 is displayed on the game play display. FIG. 16A shows the display at the beginning of the level, with lollipop 1702 empty. As the player plays the game and achieves goals, as indicated by the changes in the goal board 908, the lollipop 1702 fills up. FIG. 16B shows the game play display some time later when the user has achieved most of the goals and the lollipop 1702 is mostly full.

Once the lollipop 1702 is full, the user can activate the lollipop hammer feature by clicking on the lollipop 1702. Once selected, the user can use the lollipop to remove a game element from the game board 900. The lollipop hammer feature may be able to remove any element from the game board 900, such as blockers or elements which are not adjacent to matching elements.

Some of the game elements presented to the user on the game board 900 may be boosters, such as bombs or other elements which can be used to remove specific elements from the game board 900. These elements can be activated and used individually by the user selecting the booster.

Figure 17A:
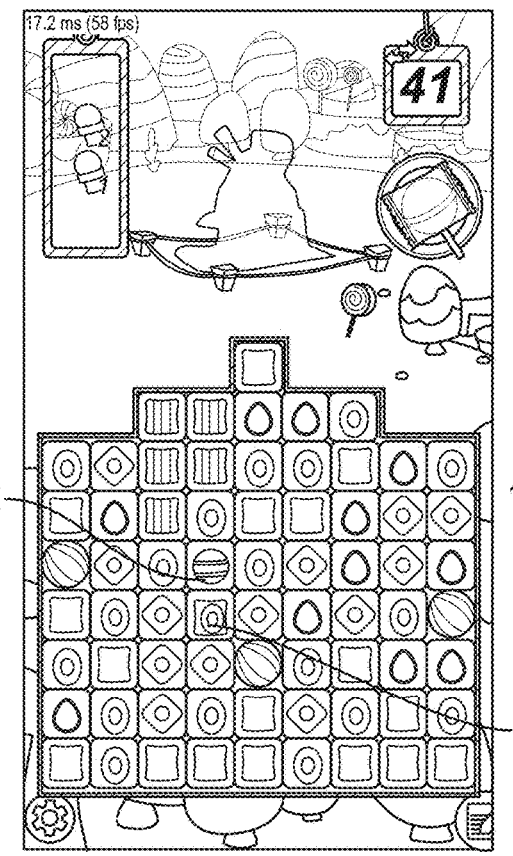
FIGS. 17A-E show and example of the user combining boosters.
Figure 17B:
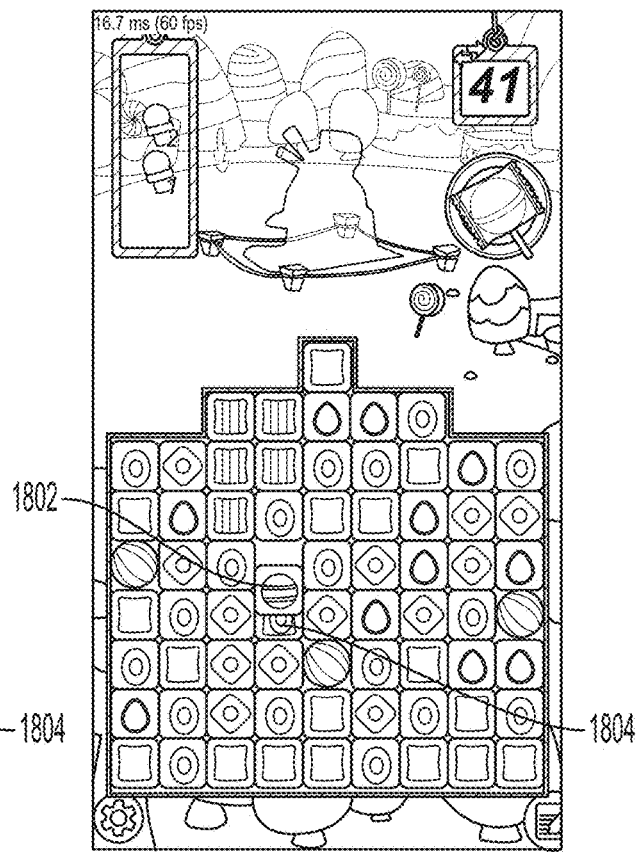
Figure 17C:
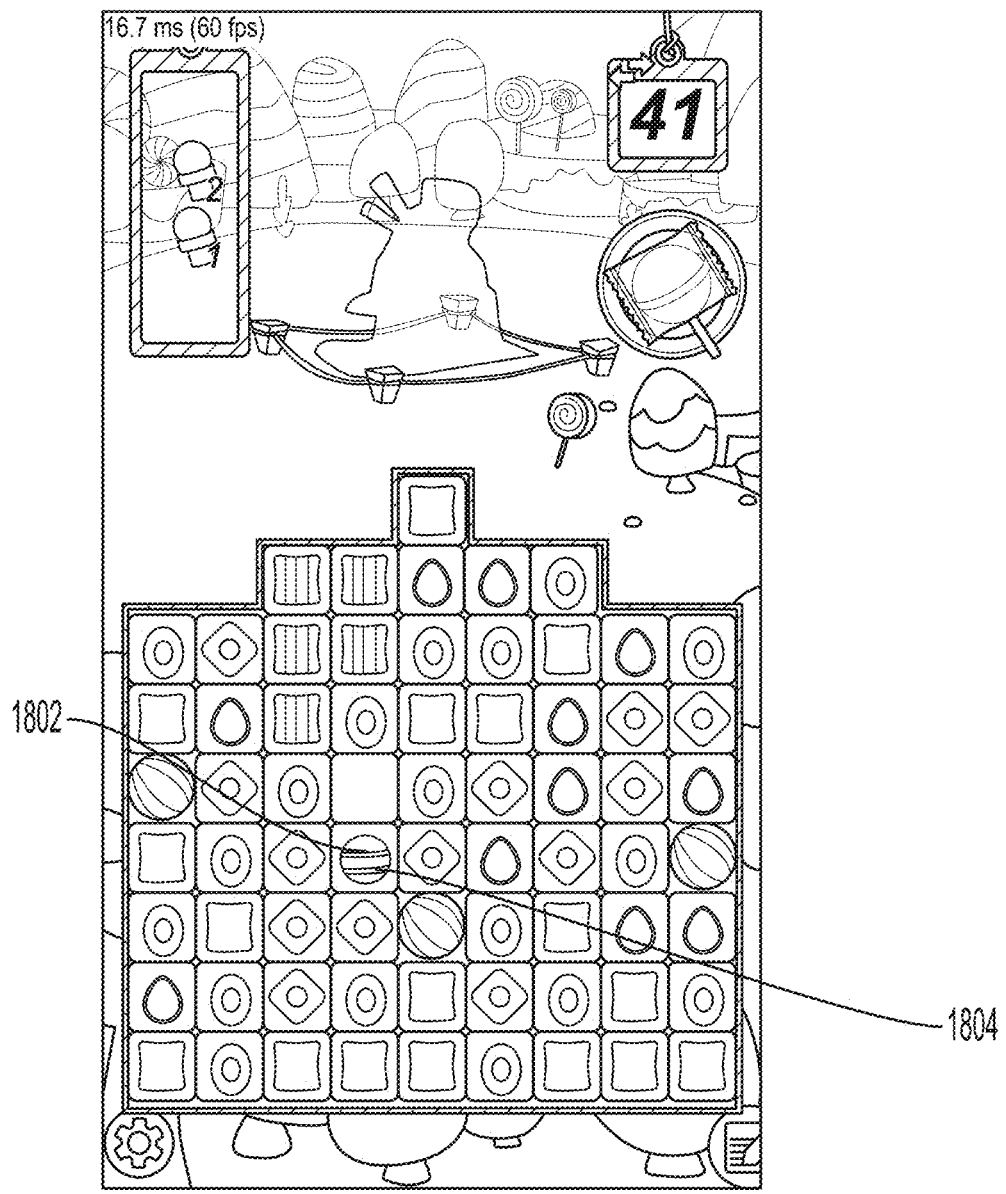

In some embodiments, it is possible for the player to combine the effects of two boosters. An example of this can be seen in FIGS. 17A-E. A stripped booster 1802 and a wrapped booster 1804 are positioned next to each other on the game board 900, as shown in FIG. 17A. When used alone, the wrapped booster 1804 eliminates the surrounding 8 game elements from the game board 900, and the striped booster 1802 eliminates all elements in the row or column in which the booster 1802 is situated. The user may choose to combine these two boosters by dragging one booster on to the other to generate a new combined wrapped and striped booster, FIGS. 17B and 17C. The combined booster is generated in the position of the wrapped booster 1804, with the user having dragged the stripped booster 1802 to the position of the wrapped booster 1804. The combined booster is activated when it is generated. It will be appreciated that other combinations of boosters may be possible.

Figure 17D:
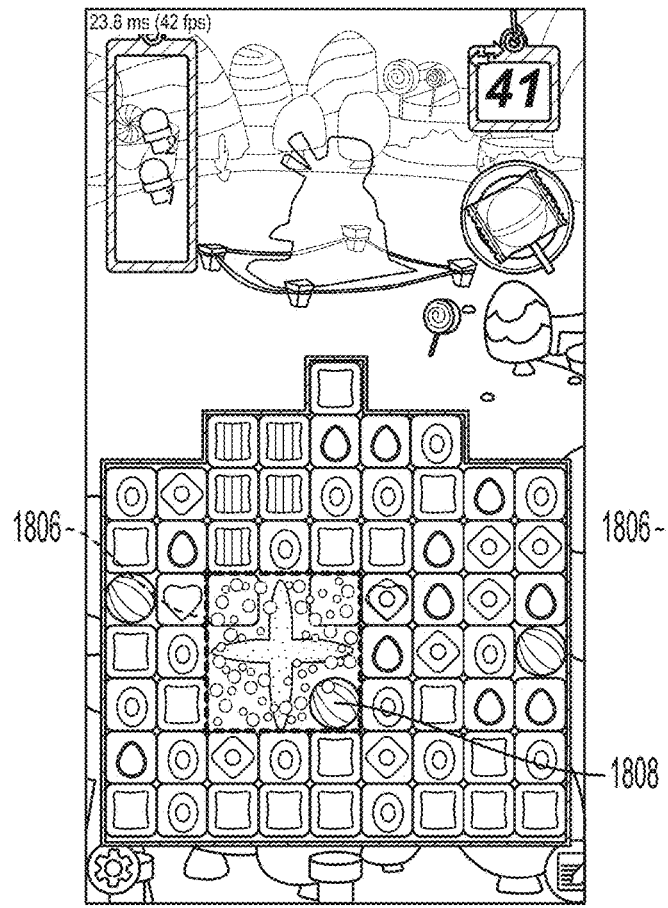
Figure 17E:
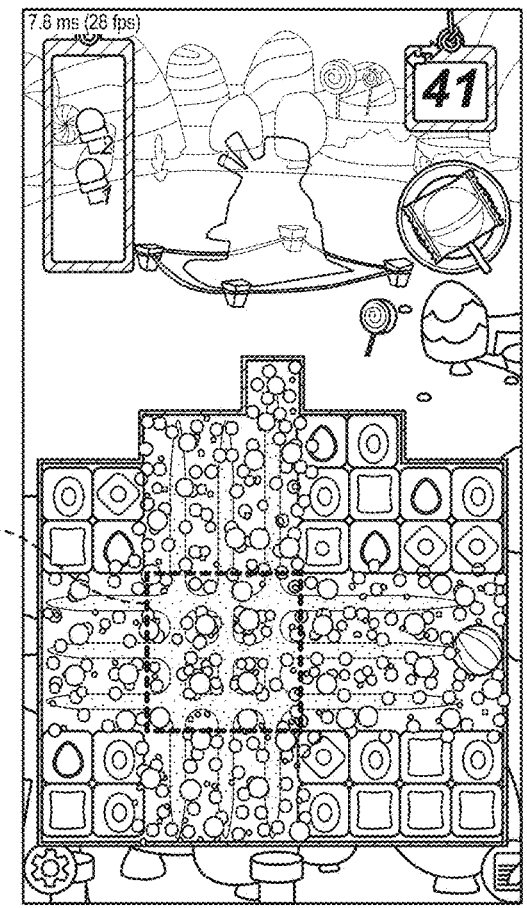

The combined booster has the effect of, first, eliminating all of the game elements surrounding the grid square in which the combined booster was generated, so all of the game elements in area 1806 shown in FIG. 17D. It can be seen that the ice cream game element 1808 has not been eliminated. This is because the ice cream 1808 has special characteristics which mean that is cannot be eliminated from the game board 900. The aim of the level is for the user to collect the ice creams 1808 at the bottom of the screen. After the elements in area 1806 are eliminated, the elements in the rows and columns corresponding to area 1806 are eliminated, as shown in FIG. 17E. Thus, the combined booster has the effect of extending the reach of the striped candy booster to all elements eliminated by the wrapped candy booster.

Figure 18A:
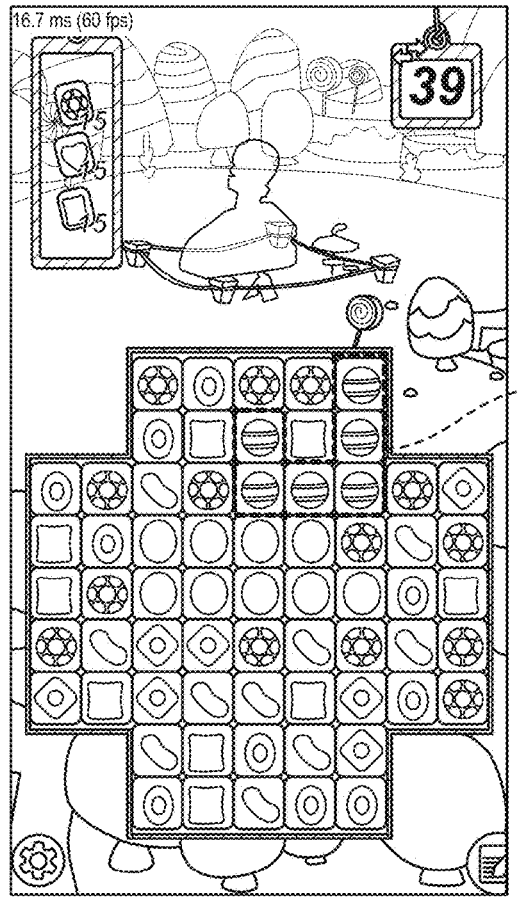
FIGS. 18A and 18B show an example of the user generating a booster.
Figure 18B:
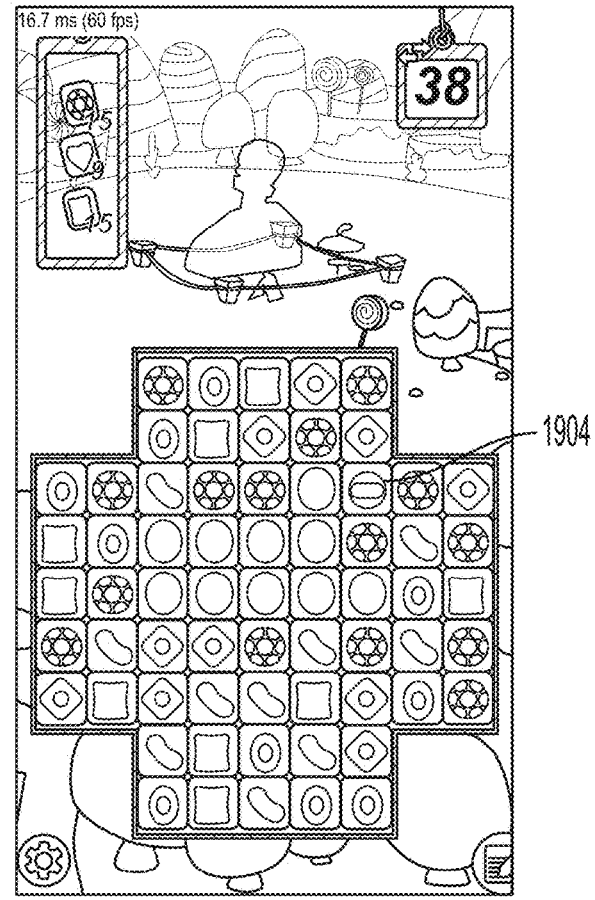

The user may be able to generate boosters in other ways. For example, it may be possible to generate boosters by combining certain groups of elements. An example is shown in FIGS. 18A and 18B. The group 1902 of blue elements shown in FIG. 18A can be seen to have an image of a striped candy on them. This image corresponds to a 'line blaster' booster, which eliminates all elements in the line of the booster. Whether this booster 1904 eliminates the game elements in the row or column in which the booster 1904 is situated may depend on the direction of the stripes on the candy. To generate the booster 1904, shown in FIG. 18B, the user selects one of the elements in the group 1902. The elements are all removed, since they are matching adjacent elements, and the line blaster booster 1904 is generated in the location of the element which the user clicked on when selecting the group 1902.

Figure 19:
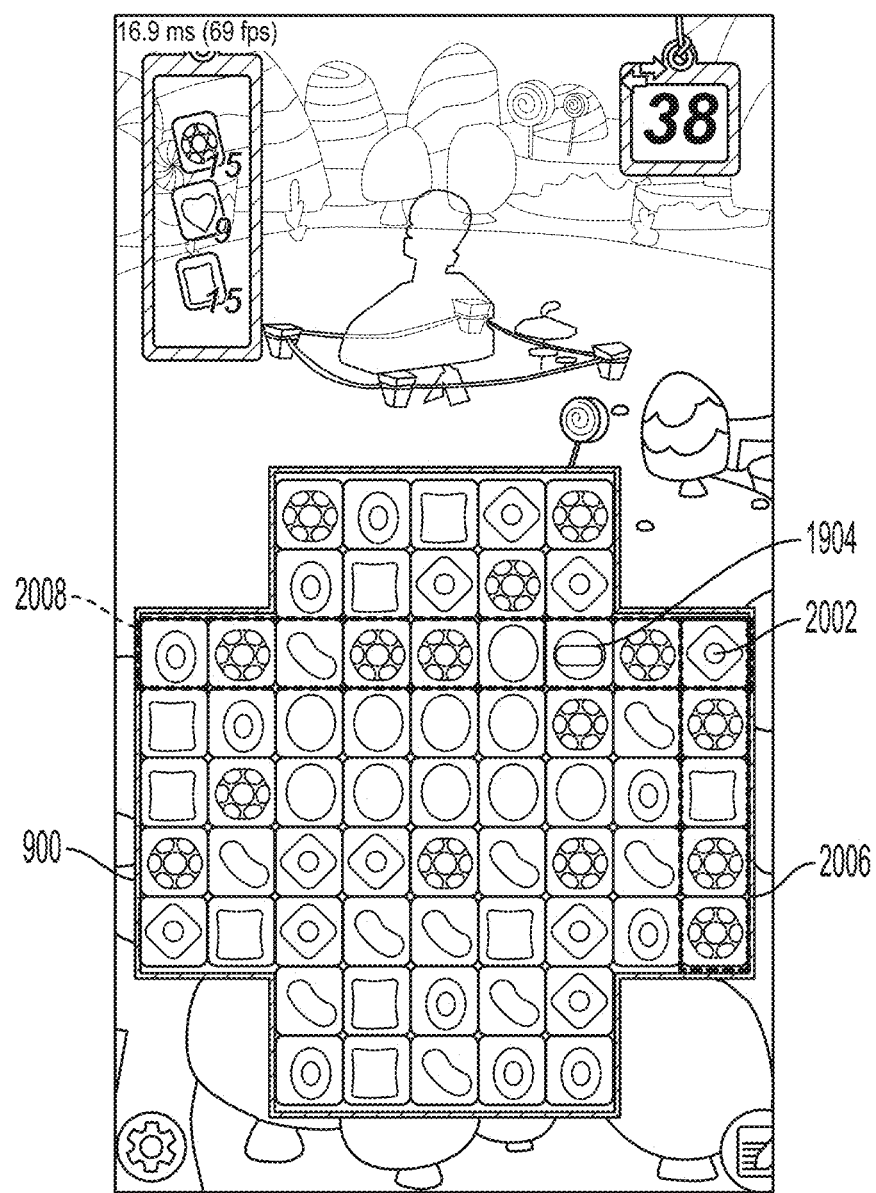
FIG. 19 shows an example of the cascading effects of a line booster.

Boosters may induce a user controllable cascading effect, as shown in FIG. 19. The line blast booster 1904, when activated by the user, would eliminate all elements in the row 2008. The line blast booster 1904 is a blue line blast booster, as indicated by its colour. According to the novel feature described herein, the effects of the line blast booster are transferred to any elements of the same type, so any blue elements 2002 in the row 2008 when the booster 1904 is activated, but in the perpendicular direction. Since blue element 2002 is in row 2008, the element 2002 also acts as a line blast booster in the direction perpendicular to the line blast booster 1904, so eliminating the elements in column 2006. Thus, when the user activates the booster 1904, all elements in both the row 2008 and the column 2002 will be removed from the game board 900. Note that this differs from a conventional cascade feature, for example in a match 3 switcher game, where the refill process may introduce its own matches and trigger boosters and effects out of the control of the user. While this is entertaining, it is inappropriate for highly strategic games such as a clicker, where a user may wish to plan ahead based on his game board.

Figure 20:
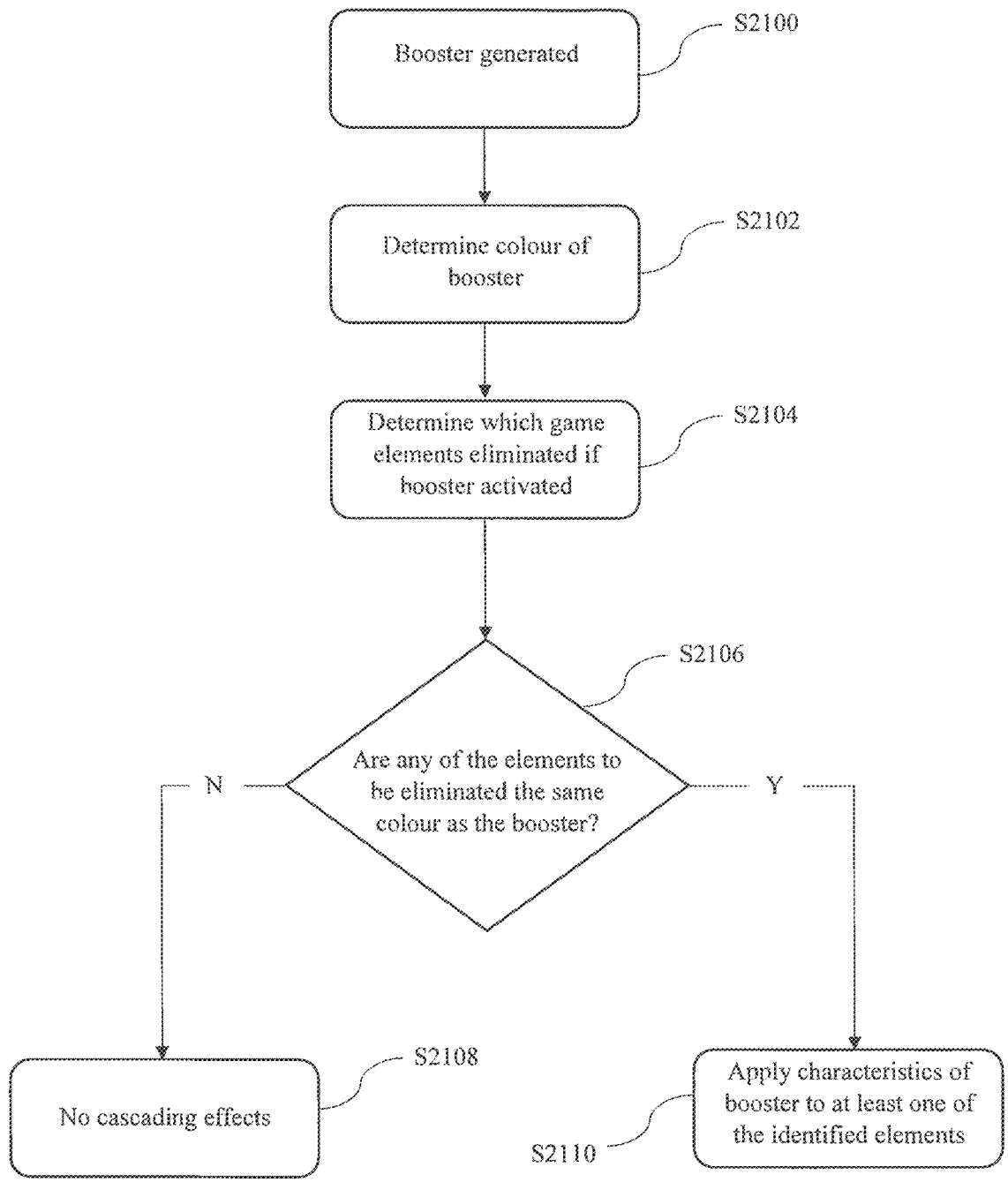
FIG. 20 is a flow diagram of the cascading effects of boosters.

The process for this is shown in FIG. 20. At step S2100 a booster is generated, such as the line blast booster 1904. The booster may be generated by the user identifying a group of matching elements with an image of the booster embedded in them, as described above, it may be generated during normal game board refill, or it may be generated by any other method.

In embodiments where the booster is generated by the user identifying a group of matching elements, the booster may be generated in its location prior to a subsequent refill process for the gameboard.

At step S2102, the system determines the type, for example the colour, of the booster, if appropriate. In the example of FIG. 20, the booster 1904 is blue.

The system then determines, at step S2104, which elements on the game board would be eliminated if the user decided to activate the booster 1904. In this case, it is the elements in row 2008.

It will be appreciated that the steps S2102 and S2104 may be performed in the reverse order, such that the elements to be eliminated by the booster are determined, S2104, before the type of the booster is determined, S2102. In other embodiments, these two steps may be performed in parallel.

At step S2106, it is determined if any of the elements in row 2008 are of the same type as the booster 1904 as determined at step S2102. Here, block 2002 would be identified since it is the same colour as the booster 1904. It will be appreciated that in some configurations of game elements, more than one element may be identified as matching the colour of the booster 1904 at step S2106. In some embodiments, only the closest element of the same type, so the same colour, as the booster would be activated to act as a booster. For example, if there were multiple blue elements in the row 2008, only the element closest to the booster 1904 would act as a booster when the booster 1904 is activated. In other embodiments, all elements of the same type as the booster would be activated. For example, if there were multiple blue elements in the row 2008, all of these elements would act as line blast boosters when the booster 1904 is activated.

Since block 2002 matches the colour of the booster 1904, the process proceeds to step S2110 where the characteristics of the booster 1904 are applied to the identified element 2002 if the user decides to activate the booster 1904 while the booster and the element are still in those positions, such that the elements in column 2006 would also be eliminated.

If, however, there were no colour matching elements in row 2008, the process would proceed to step S2108 and the characteristics of the booster 1904 are not extended to another element.

This process may be repeated for every booster available on the game board 900 after every time the game board 900 is replenished, such that any changes in the arrangement of the elements on the game board 900 are taken into account when determining if there is cascading of the characteristics of the boosters when activated by the user.

It will be appreciated that this cascading effect is not limited to line blast boosters 1904, and may be applied to any boosters presented to the user on the game board. For example, if a wrapped candy booster on the game board is activated, it will eliminate the surrounding 8 elements from the game board. If any of these eliminated elements are of the same type, e.g. same colour, as the wrapped candy booster, they too will act as wrapped candy boosters, eliminating any elements which are positioned in the 8 grid squares surrounding the elements.

In some embodiments, the cascade effect of FIG. 20 may be repeated one or more times, such that the, when the blue element 2002 is activated, it checks to see is any of the elements in column 2006 also match, i.e. if there are any blue elements in column 2006. If there are any blue elements in column 2006, these will also act as line blast boosters. This cascading effect may continue in a chain reaction until there are no matching elements in an eliminated area.

In other embodiments, the cascading effects may be limited to only those matching elements in the area eliminated by the original booster, for example, only any elements of the same type in row 2008 in FIG. 19.

In some embodiments, game board refill occurs before the element to which the booster characteristics have been transferred is activated. In the example of FIG. 19, all of the elements in row 2008 are eliminated when booster 1904 is activated, except the blue element 2002, to which the line blast booster characteristics are transferred. Game board refill occurs, such that the grid squares which have just been rendered unoccupied are filled, and then the blue element 2002, which now has the line blast characteristics, is activated. In the example of FIG. 19, no additional elements are removed from the game board 900 by following this method, however, in the case of a cascading wrapped candy booster, additional elements would be removed from the game board if refill occurs before the second element is activated.

Figure 21:
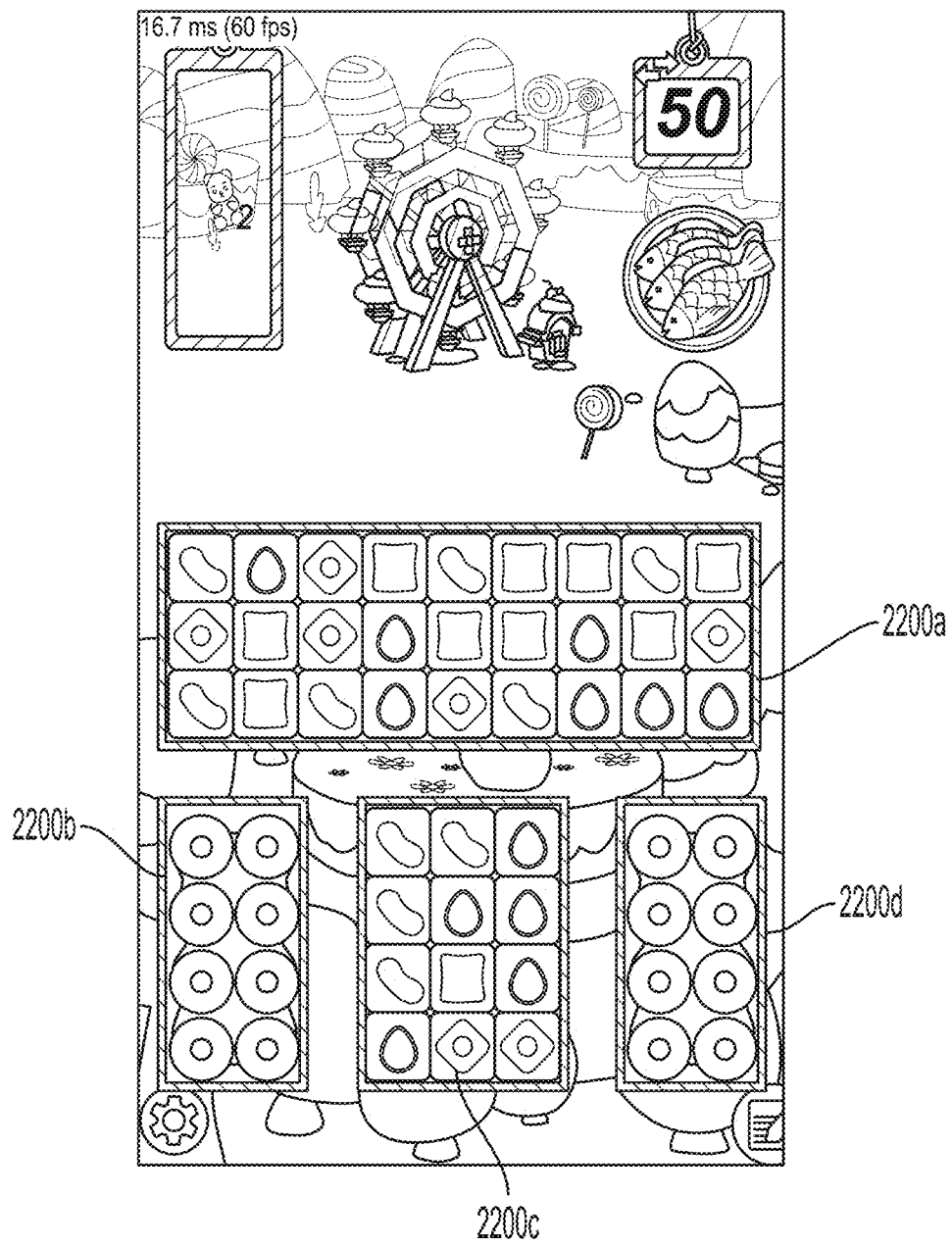
FIG. 21 shows a segmented game board.

The effects of boosters may be felt in areas of the gameboard which are disconnected from the areas of the gameboard in which the booster is activated. For example, in FIG. 21, there are four discrete areas of the gameboard 2200a, 2200b, 2200c, 2200d. If, for example, there were a line blast booster in gameboard area 2200c which, when activated, eliminated all of the game elements from its row, the elements in the corresponding row in gameboard areas 2200b and 2200d would also be eliminated. Thus, the effects of the boosters can cross gaps in the gameboard.

Figure 22:
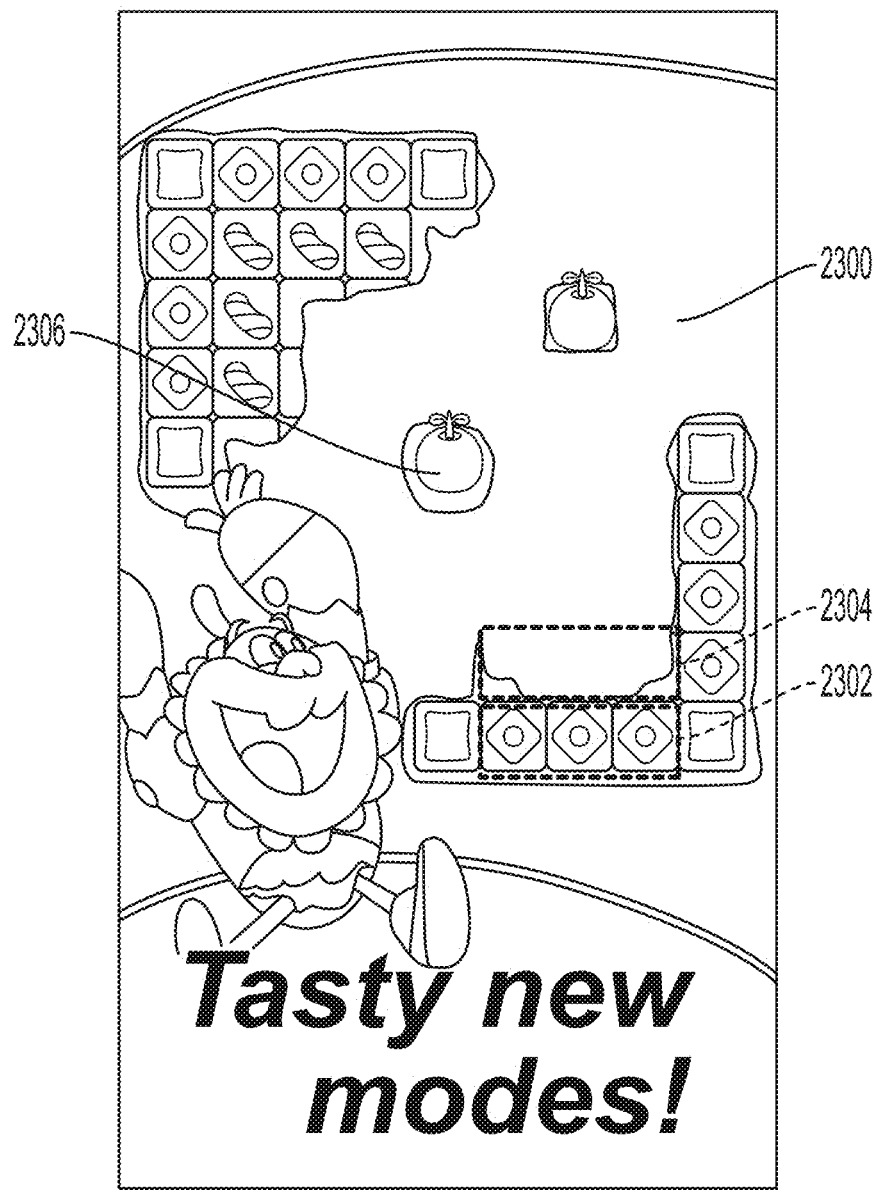
FIG. 22 shows a cotton candy game mode.

A game mode which may be implemented is shown in FIG. 22, in which part of the game board 900 is obscured by cotton candy 2300. It can be seen that some of the edges of the gameboard 900 are also obscured by the cotton candy 2300, such that the user does not know where the edges of the gameboard lie. The user must remove the cotton candy in order to view the game board underneath.

The user removes cotton candy 2300 from the game board by matching elements next to the cotton candy. The cotton candy above the game elements adjacent to the removed game elements is cleared from the game board. For example, if the user were to select the block in group 2302 for removal, the cotton candy 2300 in the gameboard area 2304 would be removed.

By removing the cotton candy 2300 from the game board, the user is able to see the game board hidden underneath, so can see the task he has to complete. For example, there may be a special element, such as an apple 2306, hidden behind a blocker which the user has to collect. The blocker may be removed by, for example, by matching elements next to the blocker, or by using a booster. The user does not know when he first starts the level what this task, or level objective, is going to be, since it is obscured from view.

The cotton candy 2300 may 'absorb' the effects of boosters. For example, if the user activates a line blast booster, the elements in the row or column to be eliminated which are visible to the user, i.e. are not obscured by the cotton candy, are removed, but any elements hidden by the cotton candy are not removed from the game board.

Figure 23:
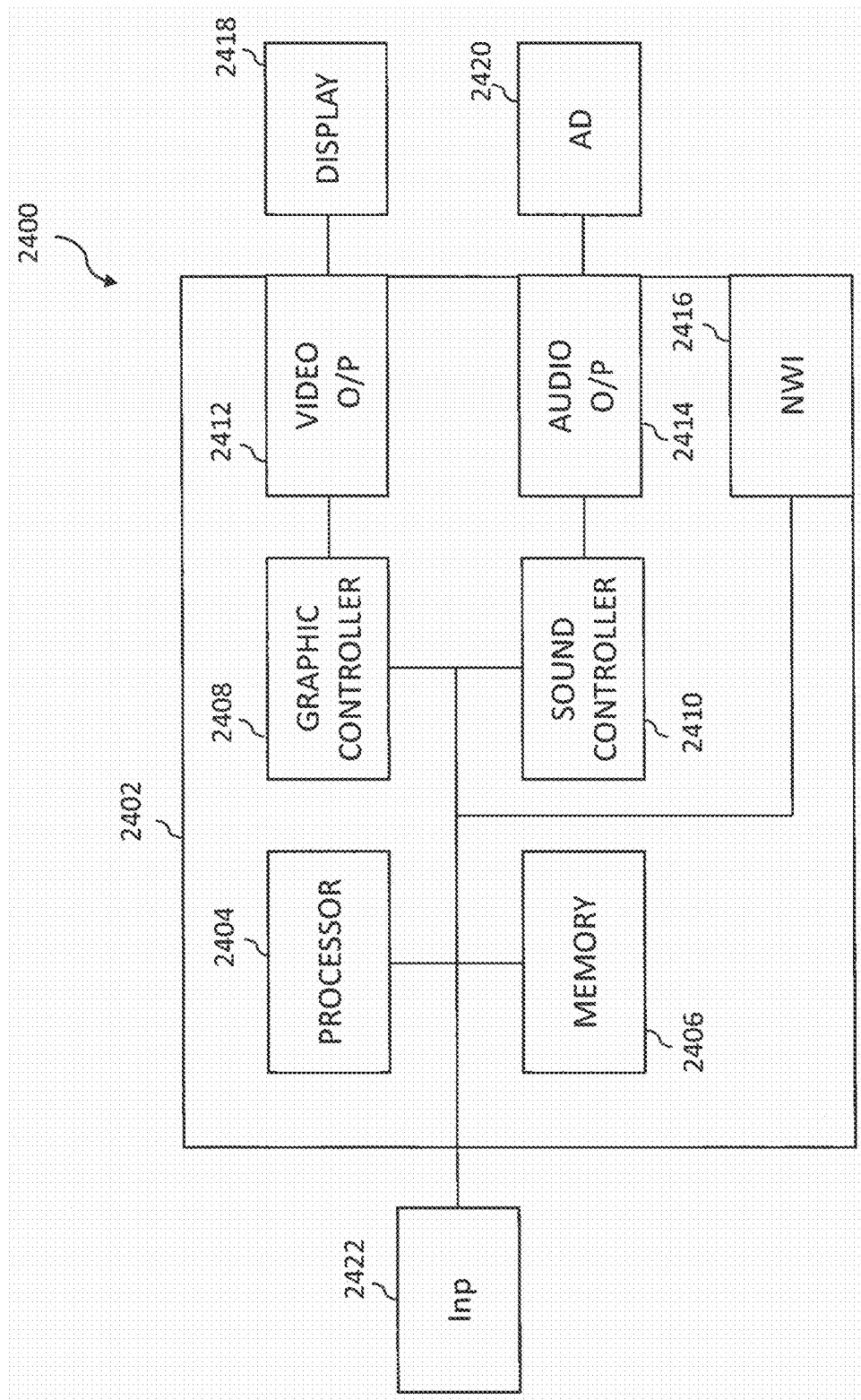
FIG. 23 is a schematic block diagram of the architecture of a computer device.

A schematic view of a user or computing device 2400 according to an embodiment is shown in FIG. 23. The user device has a controller 2402. The controller 2402 may have one or more processors 2404 and one or more memories 2406. For example, the data structure of FIG. 15 may be held in memory 2406. The controller 2402 is also shown as having a graphics controller 2408 and a sound controller 2410. It should be appreciated that one or other or both of the graphics controller 2408 and sound controller 2410 may be provided by the one or more processors 2404. Other functional blocks may also be implemented by suitable circuitry or computer code executed by the one or more processor 2404.

The graphics controller 2408 is configured to provide a video output 2412. The sound controller 2410 is configured to provide an audio output 2414. The controller 2402 has a network interface 2416 allowing the device to be able to communicate with a network such as the Internet or other communication infrastructure.

The video output 2412 may be provided to a display 2418. The audio output 2414 may be provided to an audio device 2420 such as a speaker and/or earphones(s).

The device 2400 may have an input device 2422. The input device 2422 can take any suitable format such as one or more of a keyboard, mouse, touch screen, joystick or game controller. It should be appreciated that the display 2418 may in some embodiments also provide the input device 2422, for example, by way of an integrated touch screen.

The blocks of the controller 2402 are configured to communicate with each other via an interconnect, such as a bus or any other suitable interconnect, and/or by point to point communication.

It should be appreciated that, in some embodiments, the controller 2402 may be implemented by one or more circuits, at least in part.

It should be appreciated that embodiments may be deployed in different system architectures. For example, the computer game may be implemented as a computer game that is stored in the memory 2406 of the user device 2400. However, when online, the server 205 may handle some elements of the game in some embodiments. By way of example only, a Java game applet may be provided to the user device 2400 and the locally running Java applet will generate, for example, the graphics, sounds, and user interaction for the game play on the user device 2400. Java applet can have sufficient information to allow offline play when the user device is no longer in communication with the game server 205, e.g. if connectivity is lost.

In some embodiments, the game may be implemented as a computer program that is stored in a memory system, for example the server 205, and which runs on the processor of the game server. Data streams or updates are supplied to the user device 2400 to allow the user device 2400 to render and display graphics and sounds in a browser of the user device 2400.

Figure 24:
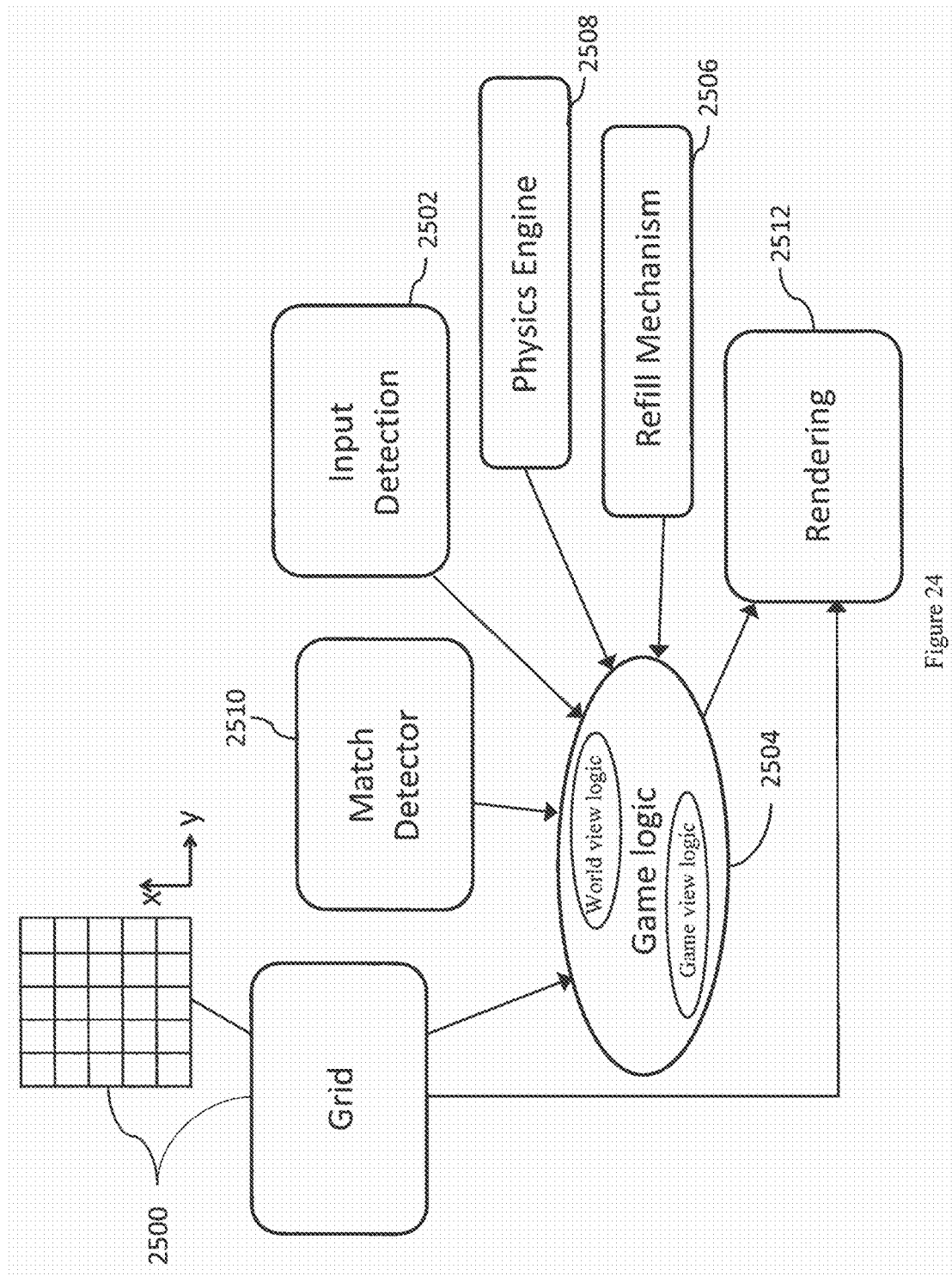
FIG. 24 shows a view of the functional components of the game.

FIG. 24 shows a schematic representation of the functional blocks of an embodiment of the present invention used to enable game play, such as that discussed above. Input detection 2502 captures the user input and feeds the input to the game logic 2504. The user input can be provided via any suitable user input device, such as those described above. In the context of the game, this user input can be used in a game view to indicate which game objects have been selected by a user, and thus to indicate the blocks to be removed and the element identifiers to be sent in a message to the opponent's device. The game logic 2504 will process the information provided by the user input. The game logic 2504 may then determine if a valid selection has been made, and what the outcomes of the selection should be.

The user input is also detected in an environment or world view to determine which buildings (complete or partially complete) have been selected and located or relocated in the virtual world. Thus, the game logic comprises game view logic and world view logic.

The rendering block is used to render the game board 900 to the user. It is also used during customisation of the buildings, as described earlier. The rendering logic generates the visualisation of the building on the user display. The user selects the colours he wants the elements of the building to be from the colour menus. The rendering logic is used to decorate the building using the selected colours.

When the user passes a level, building portion data 1004 is updated such that it represents the proportion of the levels of the story the user has completed. When the user returns to the map, the game logic 2504 (world view logic) allows the user to interact with the building in the state it is currently completed to. The user is able to move and rotate the buildings, so choosing the location and orientation of generated objects. In some embodiments, only one or some portions of the building are rendered engageable by the user. The other portions of the building may be attached to the engageable portion(s) of the building, and move when the engageable portions are moved, but are not themselves stored as engageable portions. Whether or not a portion is engageable is stored in the building portions data.

A grid component 2500 stored in a memory provides a grid representation of the game board as shown schematically in FIG. 24. The grid component can be supplied by any suitable data structure, held in a local memory or remote memory accessible by the device, and is responsible for identifying each tile location on the game board and thus providing a tile ID with which to associate information about the game element displayed at that tile location. This associated information may then be used in combination with other components in order to control the rendering of the display, e.g. the match detector component 2510, and the refill mechanism component 2506.

Each game element has object data associated therewith. The object data may be stored in any suitable memory location. In some embodiments, the object data may be provided by a data structure. In some embodiments, the object data may be considered to be part of the game logic and in other embodiments may be considered to be outside the game logic. The object data may provide information as to the properties of a game element or block. These properties can include attribute information such as colour and/or whether or not a game element has a particular function such as a booster function.

The game logic 2504 will determine the blocks selected by a user, and the actions to follow to implement the game mechanic.

Thus, the game logic controls the rules for determining if a valid group has been selected. The game logic will have access to data for each tile including its tile ID designating its location on the grid 2500, and associated tile data providing information about the contents of that tile, e.g. the game element within that tile or at least one characteristic associated with the game element within the tile. The game logic will thus be able to determine the game elements to be removed from those respective tiles for each user selection. The grid can be considered as a map which may be used to determining the relative positions of tiles on the game board from the tile ID. In embodiments of the present invention, the grid 2500 is implemented as a two-dimensional grid. By splitting the grid 2500 into row or column sets of tiles, each with their own deterministic game element generating algorithm, the game board may be simplified to a set of one-dimensional sub-grids. The grid 2500 is shown with two dimensions, x and y. However, any alpha numerical designation can be used as the tile ID. No logical relationship between tile IDs is required. However, the grid position relationship between tile IDs may be determinable from the tile ID alone, e.g. by using an array of tiles with numbered rows and lettered columns. The position of a game element may be either where the game element is or where the game element is going (e.g. the endpoint of a game element moving due to a refill).

Once a group of blocks has been successfully selected, these blocks may be removed and the respective tiles will become empty. At this stage, a refill of the empty tiles is required based on the refill mechanism 2506. The refill mechanism may also have conditions on which it relies. For example, other moves or actions taking place on the game board may have to be completed before the refill mechanism can take place.

Each tile of the grid 2500 may be associated with data to indicate a status such as filled or unfilled (empty). Thus, when the game board is refilled, each tile of the grid may be checked for such a status. Upon determining that there are tiles which are empty, the need to refill these tiles is recognised. Boolean logic may be used to determine whether a tile is to be refilled using the filled status of the tiles of the grid. The tiles must satisfy the condition of being unfilled in order to be refilled. As part of the refill mechanism, empty tiles are designated as the endpoint for particular blocks. This may be as the endpoint of a block which is already in the game board and moving as a result of a game move due to the action of the physics engine 2508, or as the endpoint of a new block entering the game board. The physics engine component 2508 is configured to control the movement of moving game elements in the display. The physics engine 2508 may be part of the game logic 2504.

A filled tile will be treated by the game logic as a solid entity, preventing any other game objects from passing through this particular tile. By filled tile it is meant that the tile is occupied by a game element, e.g. a block, a booster etc. In this way, the game logic may also force the refill mechanism to conform to certain refill trajectories or paths. That is to say new or moving game elements will not be able to pass through or refill through filled tiles. It should be appreciated that the terms pass through and refill through are dependent on the specific game rules, e.g. some game boards may refill from a direction perpendicular to the plane of the game board.

Figure 25:
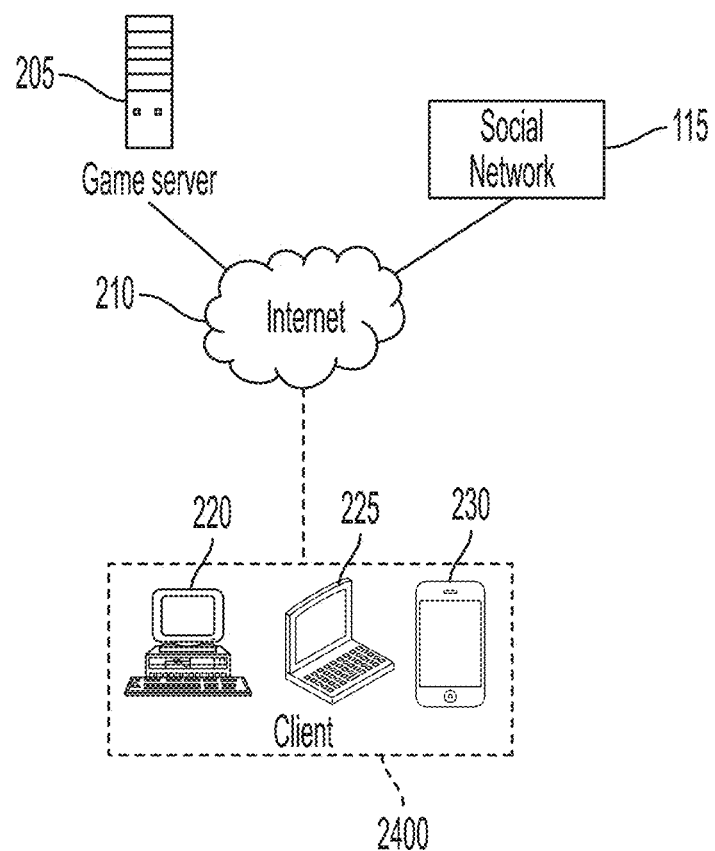
FIG. 25 shows a user device connected to a network.

FIG. 25 portrays an exemplary overall environment in which the present invention can be utilized. A virtual game is stored on for instance a game server 205. The virtual game is to be played on a client device 2400, such as a computer 220, 225 or a smartphone or other handheld device 230. The client device 240 can also be a kiosk, arcade gaming station, smart TV or other device with computing capabilities, input devices and a screen that can present the game to a user. The client device communicates with the game server 205 and a social network server 215, for instance through the Internet 210 or other network. It should be understood that the social network server 215 and the game server 205 do not have to be located in different places, they could be on the same server or on a plurality of servers located in different locations. People skilled in the art will understand that other devices than the exemplary ones listed can also be used without departing from the spirit and scope of the invention.

The invention claimed is:

1. A computer device comprising:
one or more processors; and
a user interface comprising a display; the one or more processor being configured to:
(a) in a game view, render on the display a game level in which a game board comprises a plurality of user selectable game elements of at least two types;
(b) detect that a user has caused at least two user selectable game elements of the same type to be removed by engaging with at least one of the user selectable game elements prior to its removal;
(c) execute a refill process to refill vacancies on the game board after the game elements have been removed;
(d) detect that a user has attained at least one objective of the game level by causing removal of at least certain user selectable game elements after one or more refill process;
(e) access a first portion from a store holding at least first and second portions of an object, the first and second portions being associated respectively with first and second objectives, a first portion of the object to be rendered on the display, the first portion associated with the at least one objective of the game level; and
(f) in an environment view, render on the display a representation of the virtual environment and, within the representation of the virtual environment, the first portion of the object.

2. The computer device according to claim 1, the one or more processor being configured to generate the game view by rendering a game board for a subsequent level, wherein attainment of at least one objective of the subsequent level causes a subsequent portion of the object to be accessed.

3. The computer device according to claim 2, wherein one or more processor being configured to detect that the user has attained objectives in each of a set of levels, each level associated with a portion of the object, whereby the user has completed the object, and render the completed object on the display in the environment view.

4. The computer device according to claim 3, the one or more processor being configured to detect that the user has interacted with the object or a portion of the object and change the location of the object, or portion of the object, in the virtual environment under the control of the user.

5. The computer device according to claim 1, the one or more processor being configured to present the user with object options on the display, detect selection by the user of one of the object options and access a set of levels associated with that object option.

6. The computer device according to claim 5, the one or more processor being configured to display the selected object as a visualisation to a user with one or more user engageable customisation tools operable by the user to customise the appearance of the object prior to the user's engagement with the set of levels.

7. The computer device according to claim 1, the one or more processor being configured to detect that the user has attained multiple objectives in the game level, prior to accessing the portion of the object.

8. The computer device according to claim 1, the one or more processor being configured to render in the game view a visualisation of the portion of the object associated with the at least one objective of the level that the user is playing and update the visualisation when the user makes contributing game moves which contribute towards the user attaining the at least one objective of the level.

9. The computer device according to claim 8, the one or more processor being configured to, if the user fails to attain the or all objectives of the level, render in the environment view only the portion(s) of the object associated with any prior levels which the user has completed.

10. The computer device according to claim 1, the one or more processor being configured to render on the display in the environment view a plurality of different characters, detect selection by the user of one of the characters and present to the user at least one story option associated with the selected character, the at least one story option presenting a user with a set of object options.

11. The computer device according to claim 1, the one or more processor being configured to, in step (b) detect that a user has selected the at least one of the user selectable game objects in a group of adjacent game elements of the same type, the group comprising at least two adjacent game elements of the same type.

12. The computer device according to claim 1, the one or more processor being configured to, in step (b) detect that a user has switched the respective locations of two adjacent game elements, thereby creating a match condition of at least three adjacent game elements of the same type.

13. The computer device according to claim 1, the one or more processor being configured to:
generate in the game board a special game element which when activated causes a first defined group of game elements on the game board to be removed;
detect an association between the special game element and at least one of the game elements which have been removed by its action; and
generate at the location of the at least one associated game element a second special game element which when activated causes a second defined group of game elements to be removed.

14. The computer device according to claim 13, wherein the association between the special game element and the removed game element is that they are of the same type.

15. The computer device according to claim 13 wherein:
the first defined group of game elements are aligned in a first direction; and
the second defined group of game elements are aligned in a second direction.

16. The computer device according to claim 15 wherein the game board is arranged with the game elements in rows and columns, wherein the first direction comprises a row or a column, and the second direction comprises respectively a column or a row.

17. The computer device according to claim 13 wherein the first and second defined group of game elements are arranged in an array adjacent to the first and second special game element respectively.

18. The computer device according to claim 1, the one or more processor being configured to generate on the game board at least two special game elements which are adjacent to each other, and detect that a user has interacted with one of the special game elements to move it to the location of the other of the special game elements, thereby generating an augmented game element.

19. The computer device according to claim 1, wherein the game board comprises a plurality of obscuring components, which obscure all or part of the game board, one or more processor being configured to, in response to step (b), review at least one of the obscuring component(s) adjacent a location from which the game elements were reviewed to reveal game elements which were obscured by the obscuring component(s).

20. A method of controlling a display of a computer device to render an object in a virtual environment, the method comprising:
(a) in a game view rendering on the display a game level in which a game board comprises a plurality of user selectable game elements of at least two types;
(b) detecting that a user has caused at least two user selectable game elements of the same type to be removed by engaging with at least one of the user selectable game elements prior to its removal;
(c) executing a refill process to refill vacancies on the game board after the game elements have been removed;
(d) detecting that a user has attained at least one objective of the game level by causing removal of at least certain user selectable game elements after one or more refill process;
(e) accessing a first portion from a store holding at least first and second portions of an object, the first and second portions being associated respectively with first and second objectives, a first portion of the object to be rendered on the display, the first portion associated with the at least one objective of the game level; and
(f) in an environment view, rendering on the display a representation of the virtual environment and, within the representation of the virtual environment, the first portion of the object.

21. A non transitory computer readable medium having stored thereon computer instructions which when executed by a processor in a computer device having a display cause the following steps to be carried out:

(a) in a game view rendering on the display a game level in which a game board comprises a plurality of user selectable game elements of at least two types;
(b) detecting that a user has caused at least two user selectable game elements of the same type to be removed by engaging with at least one of the user selectable game elements prior to its removal;
(c) executing a refill process to refill vacancies on the game board after the game elements have been removed;
(d) detecting that a user has attained at least one objective of the game level by causing removal of at least certain user selectable game elements after one or more refill process;
(e) accessing a first portion from a store holding at least first and second portions of an object, the first and second portions being associated respectively with first and second objectives, a first portion of the object to be rendered on the display, the first portion associated with the at least one objective of the game level; and
(f) in an environment view, rendering on the display a representation of the virtual environment and, within the representation of the virtual environment, the first portion of the object.

\* \* \* \* \*